United States Patent
Hakkani-Tür et al.

(10) Patent No.: US 9,870,356 B2
(45) Date of Patent: Jan. 16, 2018

(54) TECHNIQUES FOR INFERRING THE UNKNOWN INTENTS OF LINGUISTIC ITEMS

(71) Applicant: Microsoft Corporation, Redmond, WA (US)

(72) Inventors: Dilek Hakkani-Tür, Los Altos, CA (US); Fethiye Asli Celikyilmaz, Mountain View, CA (US); Larry P. Heck, Los Altos, CA (US); Gokhan Tur, Los Altos, CA (US); Yangfeng Ji, Altanta, GA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 360 days.

(21) Appl. No.: 14/180,335

(22) Filed: Feb. 13, 2014

(65) Prior Publication Data
US 2015/0227845 A1 Aug. 13, 2015

(51) Int. Cl.
*G06N 5/00* (2006.01)
*G06F 17/27* (2006.01)

(52) U.S. Cl.
CPC ........ *G06F 17/2785* (2013.01); *G06F 17/279* (2013.01); *G06N 5/00* (2013.01); *G06F 17/278* (2013.01)

(58) Field of Classification Search
CPC ....................................................... G06N 5/00
See application file for complete search history.

(56) References Cited

U.S. PATENT DOCUMENTS

| | | |
|---|---|---|
| 5,299,125 A | 3/1994 | Baker et al. |
| 6,246,981 B1 | 6/2001 | Papineni et al. |
| 6,442,524 B1 | 8/2002 | Ecker et al. |
| 7,016,829 B2 | 3/2006 | Brill et al. |
| 7,328,216 B2 | 2/2008 | Hofmann et al. |
| 7,599,952 B2 | 10/2009 | Parkinson |
| 7,747,438 B2 | 6/2010 | Nguyen et al. |
| 7,912,702 B2 | 3/2011 | Bennett |
| 8,024,190 B2 | 9/2011 | Hakkani-Tur et al. |
| 8,571,850 B2 | 10/2013 | Li et al. |
| 8,812,495 B1 | 8/2014 | Pragada et al. |

(Continued)

OTHER PUBLICATIONS

JR Wen et al., "Clustering User Queries of a Search Engine", ACM World Wide Web Consortium 2010, pp. 162-168.*

(Continued)

*Primary Examiner* — Vincent Gonzales
(74) *Attorney, Agent, or Firm* — Rainier Patents, P.S.

(57) ABSTRACT

Functionality is described herein for determining the intents of linguistic items (such as queries), to produce intent output information. For some linguistic items, the functionality deterministically assigns intents to the linguistic items based on known intent labels, which, in turn, may be obtained or derived from a knowledge graph or other type of knowledge resource. For other linguistic items, the functionality infers the intents of the linguistic items based on selection log data (such as click log data provided by a search system). In some instances, the intent output information may reveal new intents that are not represented by the known intent labels. In one implementation, the functionality can use the intent output information to train a language understanding model.

20 Claims, 11 Drawing Sheets

(56) References Cited

U.S. PATENT DOCUMENTS

| | | |
|---|---|---|
| 2004/0148170 A1 | 7/2004 | Acero et al. |
| 2005/0108630 A1 | 5/2005 | Wasson et al. |
| 2005/0289124 A1* | 12/2005 | Kaiser ................. G06F 17/3043 |
| 2006/0031202 A1 | 2/2006 | Chang et al. |
| 2006/0190253 A1 | 8/2006 | Hakkani-Tur et al. |
| 2007/0022109 A1 | 1/2007 | Imielinski et al. |
| 2007/0033025 A1 | 2/2007 | Helbing et al. |
| 2007/0198499 A1 | 8/2007 | Ritchford et al. |
| 2008/0133508 A1 | 6/2008 | Jiang et al. |
| 2008/0140384 A1 | 6/2008 | Landau |
| 2008/0221987 A1 | 9/2008 | Sundaresan et al. |
| 2008/0288347 A1 | 11/2008 | Sifry |
| 2009/0012842 A1 | 1/2009 | Srinivasan et al. |
| 2009/0144609 A1 | 6/2009 | Liang et al. |
| 2009/0248626 A1 | 10/2009 | Miller |
| 2010/0023331 A1 | 1/2010 | Duta et al. |
| 2011/0119050 A1 | 5/2011 | Deschacht et al. |
| 2011/0307435 A1 | 12/2011 | Overell et al. |
| 2011/0313769 A1 | 12/2011 | Gorin et al. |
| 2012/0166183 A1 | 6/2012 | Suendermann et al. |
| 2012/0290293 A1 | 11/2012 | Hakkani-Tur et al. |
| 2013/0035961 A1 | 2/2013 | Yegnanarayanan |
| 2013/0080152 A1 | 3/2013 | Brun et al. |
| 2013/0166303 A1 | 6/2013 | Chang et al. |
| 2013/0262107 A1 | 10/2013 | Bernard |
| 2014/0046934 A1 | 2/2014 | Zhou et al. |
| 2014/0067370 A1 | 3/2014 | Brun |
| 2014/0115001 A1 | 4/2014 | Arroyo |
| 2014/0236570 A1 | 8/2014 | Heck et al. |
| 2014/0236575 A1 | 8/2014 | Tur et al. |
| 2014/0258286 A1 | 9/2014 | Brown et al. |
| 2014/0280114 A1 | 9/2014 | Keysar et al. |

OTHER PUBLICATIONS

Tur, et al., Spoken Language Understanding: Systems for Extracting Semantic Information from Speech, accessible at <<http://www.amazon.com/Spoken-Language-Understanding-Extracting-Information/dp/0470688246>>, Wiley, 1st edition, published on Apr. 25, 2011, Amazon.com product page only, retrieved on Jan. 9, 2014, 4 pages.

Natarajan, et al., "Speech Enabled Natural Language Call Routing: BBN Call Director," In Proceedings of the International Conference on Spoken Language Processing (ICSLP), 2002, 4 pages.

Hakkani-Tur, "Unsupervised Relation Detection Model Training," U.S. Appl. No. 14/136,919, filed Dec. 20, 2013, 32 pages.

Border, Andrei, "A Taxonomy of Web Search," ACM SIGIR Forum, vol. 36, Issue 2, 2002, 8 pages.

Heck, et al., "Exploiting the Semantic Web for Unsupervised Spoken Language Understanding," In IEEE Spoken Language Technology Workshop, 2012, 6 pages.

Tur, et al., "Exploiting the Semantic Web for Unsupervised Natural Language Semantic Parsing," in Proceedings of the 13th Annual Conference of the International Speech Communication Association, 2012, 4 pages.

Mintz, et al., "Distant supervision for relation extraction without labeled data," Proceedings of the Joint Conference of the 47th Annual Meeting of the ACL and the 4th International Joint Conference on Natural Language Processing of the AFNLP, 2009, 9 pages.

Hakkani-Tur, et al., "Using a Knowledge Graph and Query Click Logs for Unsupervised Learning of Relation Detection," In Proceedings of the IEEE International Conference on Acoustics, Speech, and Signal Processing, May 2013, 5 pages.

Zettlemoyer, et al., "Online Learning of Relaxed CCG Grammars for Parsing to Logical Form," In Proceedings of Joint Conference on Empirical Methods in Natural Language Processing and Computational Natural Language Learning, 2007, 10 pages.

Lin, et al., "Active Objects: Actions for Entity-Centric Search," In Proceedings of the 21st International Conference on World Wide Web, 2012, 10 pages.

Chotimongkol, et al., "Automatic Concept Identification in Goal-Oriented Conversations," Carnegie Mellon University, Computer Science Department, Paper 1397, 2002, 5 pages.

Tur, et al., "Semi-Supervised Learning for Spoken Language Understanding using Semantic Role Labeling," In IEEE Workshop on Automatic Speech Recognition and Understanding, 2005, 6 pages.

Bangalore, et al., "Towards Learning to Converse: Structuring Task-Oriented Human-Human Dialogs," In Proceedings of the IEEE International Conference on Acoustics, Speech and Signal Processing, 2006, 4 pages.

Li, et al., "Unsupervised Semantic Intent Discovery from Call Log Acoustics," Proceedings of the IEEE International Conference on Acoustics, Speech and Signal Processing, 2005, 4 pages.

Lee, et al., "Unsupervised Modeling of User Actions in a Dialog Corpus," In Proceedings of the IEEE International Conference on Acoustics, Speech and Signal Processing, Mar. 2012, 4 pages.

Cheung, et al., "Sequence Clustering and Labeling for Unsupervised Query Intent Discovery," In Proceedings of the Fifth ACM International Conference on Web Search and Data Mining, Feb. 2012, 10 pages.

Yi, et al., "Query Clustering using Click-Through Graph," In Proceedings of the 18th International Conference on World Wide Web, 2009, 2 pages.

Asuncion, et al., "On Smoothing and Inference for Topic Models," In Proceedings of the Twenty-Fifth Conference on Uncertainty in Artificial Intelligence, 2009, 8 pages.

Wallach, Hanna M., "Structured Topic Models for Language," available at <<https://people.cs.umass.edu/~wallach/theses/wallach_phd_thesis.pdf, Ph.D. Dissertation, University of Cambridge, 2008, 136 pages.

Favre, et al., "Icsiboost: Open-source implementation of Boostexter (Adaboost based classifier)," available at <<https://code.google.com/p/icsiboost/>>, accessed on Jan. 23, 2014, 2 pages.

Zhang, et al., "Extracting Phrase Patterns with Minimum Redundancy for Unsupervised Speaker Role Classification," In Proceeding of Human Language Technologies: The Annual Conference of the North American Chapter of the Association for Computational Linguistics, 2010, 4 pages.

Hillard, et al., "Learning Weighted Entity Lists from Web Click Logs for Spoken Language Understanding," In Proceedings of International Speech Communication Association, 2011, 4 pages.

Gorin, et al., "How May I Help You?," Computational Linguistics, vol. 23, 1997, 15 pages.

Chu-Carroll, "Vector-based Natural Language Call Routing," In Journal of Computational Linguistics, vol. 25, Issue 3, 1999, 28 pages.

Hafiner, "Optimizing SVMs for Complex Call Classification," In Proceedings of the IEEE International Conference on Acoustics, Speech, and Signal Processing, vol. 1, 2003, 4 pages.

Chelba, et al., "Speech Utterance Classification," In Proceedings of the IEEE International Conference on Acoustics, Speech, and Signal Processing, 2003, 4 pages.

Cox, Steven, "Discriminative Techniques in Call," In Proceedings of the IEEE International Conference on Acoustics, Speech, and Signal Processing, vol. 1, 2003, 4 pages.

Higashinaka, et al., "Incorporating Discourse Features into Confidence Scoring of Intention Recognition Results in Spoken Dialogue Systems," In Proceedings of the IEEE International Conference on Acoustics, Speech, and Signal Processing, 2005, 4 pages.

Hakkani-Tur, et al., "A Weakly-Supervised Approach for Discovering New User Intents from Search Query Logs," In Proceedings of the Annual Conference of International Speech Communication Association, Aug. 2013, 5 pages.

Li, et al, "Learning Query Intent from Regularized Click Graphs," In Proceedings of 31st Annual International ACM SIGIR Conference on Research and Development in Information Retrieval, 2008, 8 pages.

Radlinski, et al., "Inferring Query Intent from Reformulations and Clicks," In Proceedings of the 19th International Conference on World Wide Web, 2010, 2 pages.

Gelman, et al., "Bayesian Data Analysis," available at <<http://www.amazon.com/Bayesian-Analysis-Edition-Chapman-Statisti-

(56) References Cited

OTHER PUBLICATIONS cal/dp/158488388X>>, Chapman and Hall/CRC publishers, 2nd Edition, 2003, Amazon.com product page only, accessed on Jul. 23, 2013, 6 pages.
Blei, et al., "Latent Dirichlet Allocation," In Journal of Machine Learning Research, vol. 3, 2003, 30 pages.
Polifroni, et al., "Using Latent Topic Features for Named Entity Extraction in Search Queries," Proceedings of the 12th Annual Conference of the International Speech Communication Association, 2011, 4 pages.
Fan, et al., "Liblinear: A Library for Large Linear Classification," In Journal of Machine Learning Research, vol. 9, 2008, 4 pages.
Gu, et al., "Cross Domain Random Walk for Query Intent Pattern Mining from Search Engine Log," Proceedings of the IEEE11th International Conference on Data Mining, 2011, 10 pages.
Pantel, et al., "Mining Entity Types from Query Logs via User Intent Modeling," In Proceedings of the 50th Annual Meeting of the Association for Computational Linguistics, vol. 1, Jul. 2012, 9 pages.
Pound, et al., "Facet Discovery for Structured Web Search: A Query-log Mining Approach," Proceedings of the ACM SIGMOD International Conference on Management of Data, 2011, 12 pages.
Strohmaier, et al., "Acquiring Knowledge about Human Goals from Search Query Logs," In the Proceedings of the International Journal Information Processing and Management, Jan. 2012, 38 pages.
Lee, et al., "Unsupervised Spoken Language Understanding for a Multi-Domain Dialog System," In IEEE Transactions on Audio, Speech, and Language Processing, vol. 21, Issue 11, Nov. 2013, 14 pages.
Tur, et al., "Towards Unsupervised Spoken Language Understanding: Exploiting Query Click Logs for Slot Filling," In Proceeding of the 12th Annual Conference of the International Speech Communication Association, 2011, 4 pages.
Hakkani-Tur, et al., "Bootstrapping Domain Detection Using Query Click Logs for New Domains," In Proceeding of the International Speech Communication Association, 2011, 4 pages.
Hakkani-Tur, Dilek, available at <<http://research.microsoft.com/en-us/people/dilekha/>>, Employee information page listing publications, Microsoft Research, Microsoft Corporation, Redmond, WA, accessed on Jan. 23, 2014, 15 pages.
Heck et al., "Leveraging Knowledge Graphs for Web-Scale Unsupervised Semantic Parsing", Proceedings of Interspeech, Jul. 30, 2013, 5 pages.
Bangalore et al., "Introduction to the Special Issue on Spoken Language Understanding in Conversational Systems", Journal of Speech Communication, vol. 48, Issue 3, Mar.-Apr. 2006, 6 pages.
Bechet et al., "Unsupervised Knowledge Acquisition for Extracting Named Entities From Speech", IEEE International Conference on Acoustics Speech and Signal Processing, Mar. 14, 2010, 4 pages.
Celikyilmaz et al., "Leveraging Web Query Logs to Learn User Intent Via Bayesian Discrete Latent Variable Model", Proceedings of the 28th International Conference on Machine Learning, Jun. 28, 2011, 6 pages.
Das et al., "Unsupervised Part-of-Speech Tagging with Bilingual Graph-Based Projections", Proceedings of the 49th Annual Meeting of the Association for Computational Linguistics: Human Language Technologies, vol. 1, Jun. 2011, 10 pages.
De Mori et al., "Spoken Language Understanding", IEEE, Signal Processing Magazine, May 2008, 9 pages.
Dinarelli, Marco, "Spoken Language Understanding: From Spoken Utterances to Semantic Structures", Ph.D. Dissertation of DISI, University of Trento, Jan. 2010, 143 pages.
Dowding et al., "Gemini: a Natural Language System for Spoken-Language Understanding", Workshop on Human Language Technology, Mar. 21, 1993, 8 pages.
Freund et al. "A Decision-Theoretic Generalization of On-Line Learning and an Application to Boosting", Journal of Computer and System Sciences, 55, Aug. 1997, 35 pages.

Ganchev et al., "Using Search-Logs to Improve Query Tagging", ACL '12 Proceedings of the 50th Annual Meeting of the Association for Computational Linguistics, Short Papers, Vol. 2, Jul. 8-14, 2012, pp. 238-242, 5 pages.
Ge, Ruifang, "Learning Semantic Parsers Using Statistical Syntactic Parsing Techniques", Proceedings of Artificial Intelligence Lab, Feb. 2006, 41 pages.
Goldwasser et al., "Confidence Driven Unsupervised Semantic Parsing", Proceedings of 49th Annual Meeting of The Association for Computational Linguistics: Human Language Technologies, vol. 1, Jun. 19, 2011, 10 pages.
Guha et al., "Semantic Search", Proceedings of the 12th International Conference on World Wide Web, May 20-24, 2003, 10 pages.
Hakkani-Tur et al., "Mining Search Query Logs for Spoken Language Understanding", Workshop on Future directions and needs in the Spoken Dialog Community: Tools and Data, Jun. 7, 2012, pp. 37-40, 4 pages.
Hakkani-Tur et al., "Employing Web Search Query Click Logs for Multi-Domain Spoken Language Understanding", Speech Labs, Microsoft, IEEE, Dec. 1, 2011, 6 pages.
Hakkani-Tur et al., "Unsupervised and Active Learning in Automatic Speech Recognition for Call Classificaiton", IEEE International Conference on Acoustics, Speech and Signal Processing, May 17, 2004, 4 pages.
Hakkani-Tur et al., "Exploiting Query Click Logs for Utterance Domain Detection in Spoken Language Understanding", IEEE International Conference on Acoustics, Speech and Signal Processing, May 22, 2011, 4 pages.
Hakkani-Tur et al., "Translating Natural Language Utterances to Search Queries for SLU Domain Detection Using Query Click Logs", IEEE International Conference on Acoustics, Speech, and Signal Processing, Mar. 2012, 4 pages.
Hassan et al., "Unsupervised Information Extraction Approach Using Graph Mutual Reinforcement", Proceedings of the 2006 Conference on Empirical Methods in Natural Language Processing, Jul. 2006, pp. 501-508, 8 pages.
Johansson et al., "Extended Constituent-to-Dependency Conversion for English", Proceedings of the 16th Nordic Conference of Computational Linguistics, May 25, 2007, pp. 105-112, 8 pages.
Krishnamurthy et al., "Weakly Supervised Training of Semantic Parsers", Proceedings of the Joint Conference on Empirical Methods in Natural Language Processing and Computational Natural Language Learning, Jul. 12, 2012, 12 pages.
Kuhn et al., "The Application of Semantic Classification Trees to Natural Language Understanding", IEEE Transactions on Pattern Analysis and Machine Intelligence, vol. 17, Issue 5, May 1995, 12 pages.
Lafferty et al., "Conditional Random Fields: Probabilistic Models for Segmenting and Labeling Sequence Data", Proceedings of the Eighteenth International Conference on Machine Learning, Jun. 28, 2001, 8 pages.
Lane et al., "Out-of-Domain Utterance Detection Using Classification Confidences of Multiple Topics", IEEE Transactions on Audio, Speech, and Language Processing archive, vol. 15, Issue 1, Jan. 2007, 12 pages.
Lenat, Douglas B., "CYC: A Large-Scale Investment in Knowledge Infrastructure", Communications of the ACM, vol. 38, Issue 11, Nov. 1995, 7 pages.
Li et al., "Extracting Structured Information from User Queries with Semi-Supervised Conditional Random Fields", Proceedings of the 32nd International ACM SIGIR Conference on Research and Development in Information Retrieval, Jul. 19-23, 2009, 8 pages.
Liu et al., "Lexicon Modeling for Query Understanding", Proceedings of the IEEE International Conference on Acoustics, Speech, and Signal Processing, May 22, 2011, 4 pages.
Lowe et al., "A Frame-Semantic Approach to Semantic Annotation", ACL SIGLEX Workshop on Tagging Text with Lexical Semantics, Apr. 1997, 7 pages.
Martin et al., "The DET Curve in Assessment of Detection Task Performance", Eurospeech, Rhodes, Greece, Sep. 1997, 4 pages.
McIlraith et al., "Semantic Web Services", Journal of IEEE Intelligent Systems, vol. 16, Issue 2, Mar./Apr. 2001, 8 pages.

(56) References Cited

OTHER PUBLICATIONS

Petrov et al., "Learning and Inference for Hierarchically Split PCFGs", Proceedings of the 22nd National Conference on Artificial Intelligence, vol. 2, Jun. 22, 2007, 4 pages.
Pieraccini et al., "A Speech Understanding System Based on Statistical Representation of Semantics", Proceedings of IEEE International Conference on Acoustics, Speech and Signal Processing, Mar. 23, 1992, 4 pages.
Poon et al., "Unsupervised Semantic Parsing", Proceedings of the Conference on Empirical Methods in Natural Language Processing, vol. 1, Aug. 6, 2009, 10 pages.
Popescu et al.,"Modern Natural Language Interfaces to Databases: Composing Statistical Parsing with Semantic Tractability", Proceedings of 20th International Conference on Computational Linguistics, Aug. 23, 2004, 7 pages.
Price, P. J., "Evaluation of Spoken Language Systems: the ATIS Domain", Workshop on Speech and Natural Language, Jun. 1990, 5 pages.
Raymond et al., "Generative and Discriminative Algorithms for Spoken Language Understanding", Interspeech, Aug. 27, 2007, 4 pages.
Seneff, Stephanie, "TINA: A Natural Language System for Spoken Language Applications", Computational Linguistics, vol. 18, Issue 1, Mar. 1992, 26 pages.
Shadbolt et al., "The Semantic Web Revisited", Journal of IEEE Intelligent Systems, vol. 21, Issue 3, May/Jun. 2006, 6 pages.
Steedman, Mark, "Surface Structure and Interpretation", Proceedings of Computational Linguistics, vol. 24, Issue 1, Apr. 4, 1996, 3 pages.
Wang et al., "Semi-Supervised Learning of Semantic Classes for Query Understanding—from the Web and for the Web", Proceedings of the 18th ACM Conference on Information and Knowledge Management, Nov. 2-6, 2009, 10 pages.
Wang et al., "Combining Statistical and Knowledge-based Spoken Language Understanding in Conditional Models", Proceedings of the COLING/ACL 2006 Main Conference Poster Sessions, Jul. 2006, pp. 882-889, 8 pages.
Wang et al., "Discriminative Models for Spoken Language Understanding", International Conference on Spoken Language Processing, Sep. 17, 2006, 4 pages.
Ward et al., "Recent Improvements in the CMU Spoken Language Understanding System", Workshop on Human Language Technology, Mar. 8, 1994, 4 pages.
Yarowsky, David, "Unsupervised Word Sense Disambiguation Rivaling Supervised Methods", Proceedings of the 33rd Annual Meeting on Association for Computational Linguistics, Jun. 26, 1995, 8 pages.
Yeh et al., "Stochastic Discourse Modeling in Spoken Dialogue Systems Using Semantic Dependency Graphs", Proceedings of the COLING/ACL 2006 Main Conference Poster Sessions, Jul. 2006, pp. 937-944, 8 pages.
Requirement for Restriction/Election mailed Feb. 26, 2016 from U.S. Appl. No. 14/136,919, 24 pages.
Response filed Mar. 31, 2016 to the Requirement for Restriction/Election mailed Feb. 26, 2016 from U.S. Appl. No. 14/136,919, 6 pages.
Non-Final Office Action mailed Jul. 11, 2016 from U.S. Appl. No. 14/136,919, 19 pages.
Non-Final Office Action mailed Dec. 17, 2014 from U.S. Appl. No. 13/769,679, 12 pages.
Applicant-Initiated Interview Summary mailed Mar. 25, 2015 from U.S. Appl. No. 13/769,679, 3 pages.
Response filed Apr. 17, 2015 to the Non-Final Office Action mailed Dec. 17, 2014 from U.S. Appl. No. 13/769,679, 12 pages.
Final Office Action mailed Jun. 26, 2015 from U.S. Appl. No. 13/769,679, 12 pages.
Response filed Sep. 25, 2015 to the Final Office Action mailed Jun. 26, 2015 from U.S. Appl. No. 13/769,679, 14 pages.
Non-Final Office Action mailed Oct. 20, 2015 from U.S. Appl. No. 13/769,679, 13 pages.
Response filed Feb. 22, 2016 to the Non-Final Office Action mailed Oct. 20, 2015 from U.S. Appl. No. 13/769,679, 14 pages.
Final Office Action mailed May 26, 2016 from U.S. Appl. No. 13/769,679, 19 pages.
Non-Final Office Action mailed Apr. 10, 2015 from U.S. Appl. No. 13/773,269, 37 pages.
Response filed Oct. 9, 2015 to the Non-Final Office Action mailed Apr. 10, 2015 from U.S. Appl. No. 13/773,269, 19 pages.
Final Office Action mailed Nov. 19, 2015 from U.S. Appl. No. 13/773,269, 46 pages.
Response filed Feb. 17, 2016 to the Final Office Action mailed Nov. 19, 2015 from U.S. Appl. No. 13/773,269, 15 pages.
Applicant-Initiated Interview Summary mailed Mar. 31, 2016 from U.S. Appl. No. 13/773,269, 3 pages.
Non-Final Office Action mailed Apr. 7, 2016 from U.S. Appl. No. 13/773,269, 38 pages.
Response filed Aug. 8, 2016 to the Non-Final Office Action mailed Apr. 7, 2016 from U.S. Appl. No. 13/773,269, 18 pages.
Tur et al., "Spoken Language Understanding," 2011, John Wiley & Sons, 450 pages.
Notice of Non-Compliant Amendment mailed Nov. 9, 2016 from U.S. Appl. No. 13/773,269, 3 pages.
Response filed Jan. 9, 2017 to the Notice of Non-Compliant Amendment mailed Nov. 9, 2016 from U.S. Appl. No. 13/773,269, 18 pages.
Notice of Appeal filed Oct. 25, 2016 from U.S. Appl. No. 13/769,679, 2 pages.
Response filed Nov. 14, 2016 to the Non-Final Office Action mailed Jul. 11, 2016 from U.S. Appl. No. 14/136,919, 26 pages.
Appeal Brief filed Jan. 25, 2017 from U.S. Appl. No. 13/769,679, 25 pages.
Final Office Action dated Feb. 8, 2017 from U.S. Appl. No. 14/136,919, 23 pages.
Final Office Action dated Mar. 13, 2017 from U.S. Appl. No. 13/773,269, 44 pages
Final Office Action dated Mar. 13, 2017 from U.S. Appl. No. 13/773,269, 44 pages.
Examiner's Answer dated May 9, 2017 from U.S. Appl. No. 131769,679, 14 pages.
Applicant Initiated Interview Summary dated May 31, 2017 from U.S. Appl. No. 14/136,919, 6 pages.
Response filed Jun. 8, 2017 to Final Office Action dated Feb. 8, 2017 from U.S. Appl. No. 14/136,919, 24 pages.

\* cited by examiner

US 9,870,356 B2

TECHNIQUES FOR INFERRING THE UNKNOWN INTENTS OF LINGUISTIC ITEMS

BACKGROUND

Traditional machine learning techniques use human annotators to manually apply labels to training data. However, manual techniques for annotating training data can be labor-intensive and cumbersome. To address this issue, some techniques attempt to generate the labels in an automated or semi-automated manner. Yet there is room for considerable improvement in these types of automated techniques for assigning labels to training data.

SUMMARY

Functionality is described herein for determining the intents of linguistic items, such as queries. In one implementation, the functionality operates by receiving input data having: (a) a first set of linguistic items with known intent labels; and (b) a second set of linguistic items that lack known intent labels. The functionality then leverages a model, in conjunction with selection log data (such as click log data), to determine an intent associated with each linguistic item in the input data. This operation yields intent output information. The intent assigned to each linguistic item is selected from a set of possible semantic intent classes, including a first group of known intents (associated with the known intent labels), and a second group of unknown intents (not represented by the known intent labels).

According to another illustrative aspect, the functionality may obtain the known intent labels from relations expressed by any type of knowledge resource, such as a knowledge graph.

According to one illustrative aspect, the functionality employs a generative model to assign intents to linguistic items in the input data, such as a Bayesian hierarchical graphical model.

According to another illustrative aspect, the generative model can represent user actions by assuming that the user submits a linguistic item (e.g., a query) with a particular intent in mind. That intent, in turn, is presumed to influence the user's subsequent actions, such as the words that a user uses to compose his or her query, and the click selections made by a user in response to submitting the query.

According to another illustrative aspect, the operation of determining an intent for each linguistic item involves: (a) if the linguistic item corresponds to a member of the first set of linguistic items, deterministically assigning an intent to the linguistic item based on the known intent label associated with the linguistic item; and (b) if the linguistic item corresponds to a member of the second set, inferring the intent associated with the linguistic item using the model, based on the selection log data.

According to another illustrative aspect, the functionality may train a language understanding model based on the intent output information.

According to another illustrative aspect, the functionality can alternatively infer the intents of linguistic items without the use of any known intent labels.

The above approach can be manifested in various types of systems, devices, components, methods, computer readable storage media, data structures, graphical user interface presentations, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes an illustrative computer system for determining intents associated with linguistic items, such as queries. Section B sets forth illustrative methods which explain the operation of the computer system of Section A. Section C describes illustrative computing functionality that can be used to implement any aspect of the features described in Sections A and B.

Figure 12:
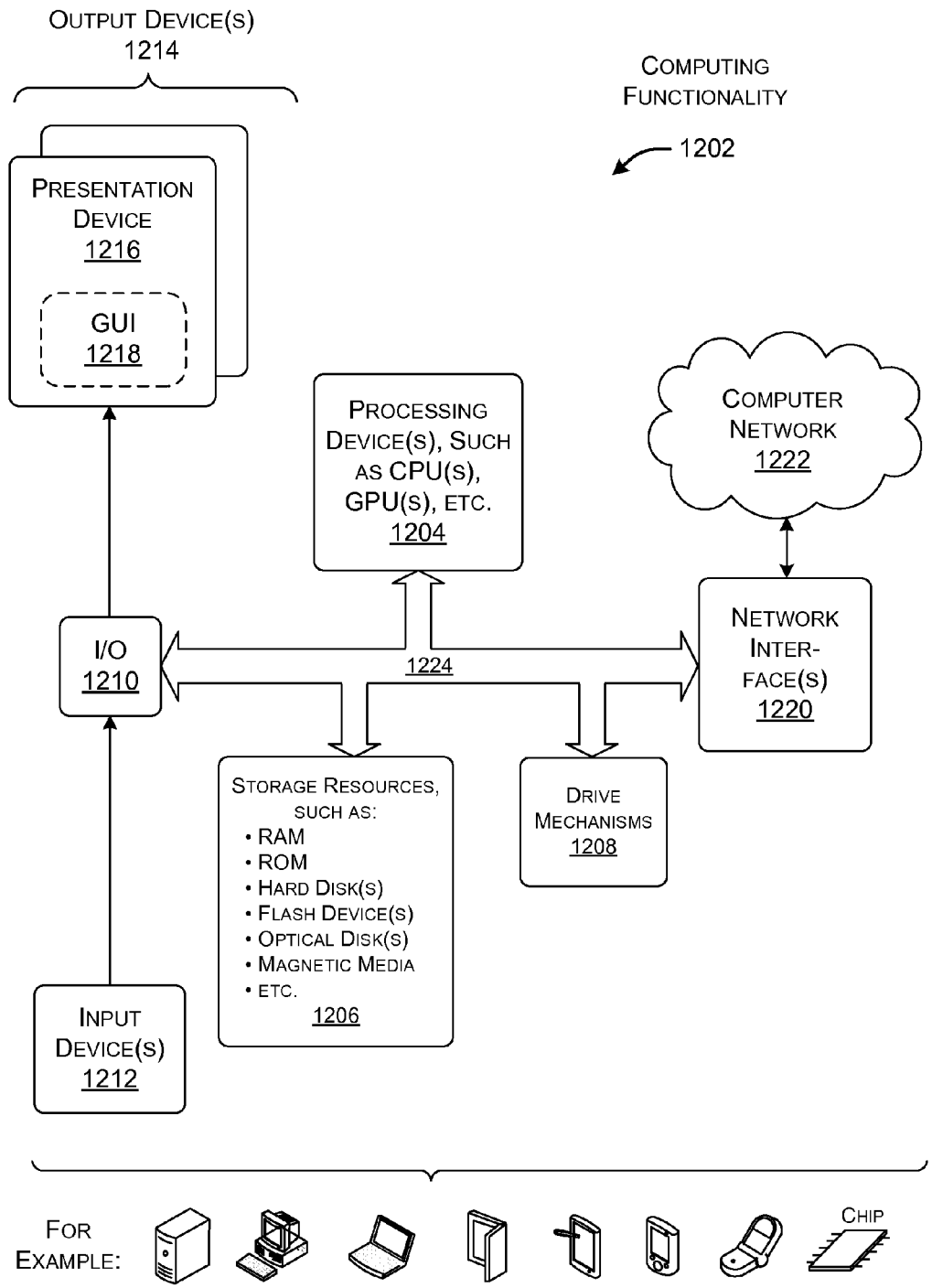
FIG. 12 shows illustrative computing functionality that can be used to implement any aspect of the features shown in the foregoing drawings.

As a preliminary matter, some of the figures describe concepts in the context of one or more structural components, variously referred to as functionality, modules, features, elements, etc. The various components shown in the figures can be implemented in any manner by any physical and tangible mechanisms, for instance, by software running on computer equipment, hardware (e.g., chip-implemented logic functionality), etc., and/or any combination thereof. In one case, the illustrated separation of various components in the figures into distinct units may reflect the use of corresponding distinct physical and tangible components in an actual implementation. Alternatively, or in addition, any single component illustrated in the figures may be implemented by plural actual physical components. Alternatively, or in addition, the depiction of any two or more separate components in the figures may reflect different functions performed by a single actual physical component. FIG. 12, to be described in turn, provides additional details regarding one illustrative physical implementation of the functions shown in the figures.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). The blocks shown in the flowcharts can be implemented in any manner by any physical and tangible mechanisms, for instance, by software running on computer equipment, hardware (e.g., chip-implemented logic functionality), etc., and/or any combination thereof.

As to terminology, the phrase "configured to" encompasses any way that any kind of physical and tangible functionality can be constructed to perform an identified operation. The functionality can be configured to perform an operation using, for instance, software running on computer equipment, hardware (e.g., chip-implemented logic functionality), etc., and/or any combination thereof.

The term "logic" encompasses any physical and tangible functionality for performing a task. For instance, each operation illustrated in the flowcharts corresponds to a logic component for performing that operation. An operation can be performed using, for instance, software running on computer equipment, hardware (e.g., chip-implemented logic functionality), etc., and/or any combination thereof. When implemented by computing equipment, a logic component represents an electrical component that is a physical part of the computing equipment, however implemented.

The following explanation may identify one or more features as "optional." This type of statement is not to be interpreted as an exhaustive indication of features that may be considered optional; that is, other features can be considered as optional, although not expressly identified in the text. Finally, the terms "exemplary" or "illustrative" refer to one implementation among potentially many implementations.

A. Illustrative Computer System

A.1. Overview of the Computer System

Figure 1:
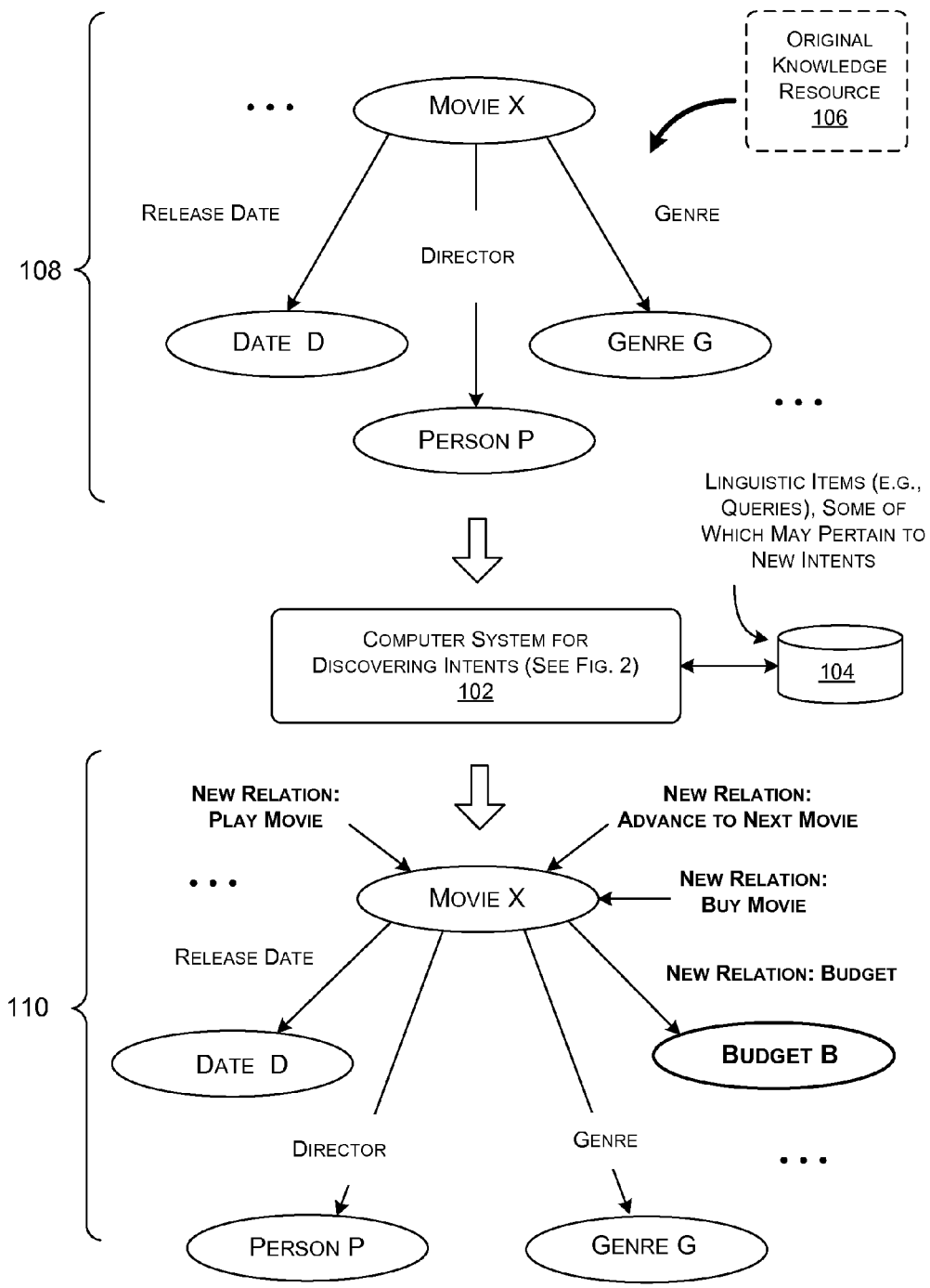
FIG. 1 shows an overview of the operation of a computer system for discovering new intents in input data, by leveraging known intents expressed by a knowledge resource (e.g., a knowledge graph) in conjunction with selection log data (e.g., click log data).

FIG. 1 shows an overview of one manner of operation of a computer system 102 for determining the intents of linguistic items. By way of overview, the computer system 102 operates by receiving input data from an input data store 104. The input data includes a set of linguistic items. Each linguistic item corresponds to an utterance made up of one or more words. In some contexts, a user may have submitted the linguistic item to some system with the objective of obtaining information or performing some other action. For example, a linguistic item may correspond to a query d that a user has submitted to a search system. Each linguistic item is also associated with some action that a user takes in response to submitting the linguistic item. For example, for a query, the action may correspond to a click selection that the user has made after submitting the query, e.g., by clicking on (or otherwise showing interest in) a particular item in a list of search result items that a search system has provided in response to the user's submission of the query.

The computer system 102 operates by associating an intent with each linguistic item in the input data, to produce the intent output information. The intent refers to the presumed objective of the user in submitting the linguistic item. For example, a user who has submitted the query, "Who starred in the movie Mission Impossible?" may be interested in discovering the lead actor in the movie, "Mission Impossible." The computer system 102 may therefore assign a descriptive label to the query that corresponds to the identified intent, such as "lead actor" or the like.

More specifically, in one implementation, the input data includes two sets of linguistic items. A first set includes linguistic items that have known intent labels associated therewith. A second set of linguistic items lack known intent labels. The computer system 102 determines the intent of a particular linguistic item in the following manner. If the linguistic item already has a known intent label associated with it, then the computer system assigns an intent to the linguistic item that matches the known intent label. But if the linguistic item lacks a known intent label, the computer system 102 uses a model to infer the intent, by leveraging selection log data. As the term is used herein, selection log data corresponds to a collection of selections made by users in response to the submission of linguistic items. More concretely stated, if the linguistic items are queries, the selection log data represents click log data, corresponding to click selections made by users in response to the submission of queries.

In one implementation, the model may correspond to any type of generative model, such as a Bayesian hierarchical graphical model. Subsection A.3 (below) provides details regarding one implementation of such a model, and one manner of solving for unknown (latent) intent variables using the model.

The computer system 102 may use a preliminary intent-labeling system (PILS) (not shown in FIG. 1) to obtain or derive the known intent labels based on any knowledge resource 106. In one case, for example, the knowledge resource 106 may correspond to a knowledge graph. A knowledge graph identifies a plurality of entities (or concepts) and a plurality of relations between respective pairs of entities. The PILS may treat each relation in the knowledge resource 106 as a known intent. Subsection A.2 (below) describes one non-limiting implementation of the PILS.

Before delving into the details of the computer system 102 itself, consider the high-level example depicted in FIG. 1. That figure shows a small portion 108 of an original knowledge graph. The knowledge graph shows four nodes associated with four respective particular entities: "movie X," "date D," "person P," and "genre G." A first "release date" link connects the "movie X" and "date D" nodes. That link pertains to a release date of a movie, meaning that one can follow the "release date" link to identify the release date of the identified movie X. The PILS may assign a "release date" intent to a particular query, corresponding to the above-described "release date" link, if it is able to determine that the query pertains to this link. For example, a user who enters the query, "What year was the movie Mission Impossible released?" is apparently targeting the "release date" link in the knowledge graph.

Similarly, a second "director" link connects the "movie X" and "person P" nodes. That link pertains to the director of a movie, meaning that one can follow the "director" link to identify the director who directed the identified movie X. A third "genre" link connects the "movie X" and "genre G" nodes. The "genre" link pertains to the genre of a movie, meaning that one can follow the "genre" link to identify the genre of the identified movie X. As can be appreciated, the full knowledge graph will typically include a large number of additional entities and relations. For example, the "director" link in the full knowledge graph (not shown) may link together a great number of movie titles with the movies' respective directors.

In general, note that this particular knowledge graph, in its original state, provides an ontology that is well suited to answering informational inquiries. A user composes an informational query with the objective of discovering information that he or she presently does not know.

In the course of assigning intents to queries, the computer system 102 may identify new intents that are not represented by the original knowledge graph. For example, FIG. 1 shows a small portion 110 of a modified knowledge graph, depicting four new relations identified by the computer system 102. More specifically, the modified knowledge graph includes all four of the entities and all three of the relations in the original knowledge graph (as described above). In addition, the modified knowledge graph includes a new "play movie" link that represents an instruction to play the movie X. The modified knowledge graph also includes a new "advance to next movie" link that represents an instruction to advance to a next movie, relative to movie X. The modified graph also includes a new "buy movie" link that represents an instruction to purchase the movie X.

The above three types of new relations are examples of non-informational relations, meaning that a user who enters a linguistic item directed to one of these relations is not primarily interested in finding information. For example, the "play movie" link is an example of a transactional intent; in general, a user enters this type of instruction with the objective of performing an operation on a specified entity or entities. The "advance to next movie" link is an example of a navigational intent; in general, a user enters this type of instruction with the objective of navigating within a human-to-machine interface, relative to the specified entity or entities. The "buy movie" link is an example of a financial intent; in general, a user enters this type of instruction with the objective of performing a financial transaction with respect to the specified entity or entities. Still other types of non-informational links are possible.

The computer system 102 can also identify one or more new types of informational relations. For example, the computer system 102 can identify a new "budget" link which connects movie X to a "budget B" node. One can follow the "budget" link to identify the budget of the identified movie X.

As will be described in detail below, the model, used by the computer system 102, may assume that each user who inputs a linguistic item (e.g., a query) has a specific intent in mind, representing as a probabilistic distribution over K possible semantic intent classes. Some of the intents are known intents, while others are unknown. Moreover, the model assumes that the user's intent influences his or her subsequent actions, such as the words that the user uses to compose the query and the click selections that a user makes after submitting the query. The computer system 102 uses the model to probabilistically identify patterns in these actions to identify clusters of queries associated with the new intents. In this inference process, the known intent labels serve as a form of partial, automated supervision. Further, the click log data serves as a form of implicit supervision. For example, a user who clicks on a site associated with movie reviews after submitting a particular query is presumed to have entered the query with an intent to discover a review for a movie. According to another illustrative aspect, the computer system 102 can identify the four above-described new intents without affecting the integrity at which it classifies linguistic items into the known intent classes (i.e., the "release date," "director," and "genre" intents).

Note that the knowledge resource 106 may correspond to any type of data structure, not necessarily a graph structure. For example, the knowledge resource may correspond to a table, list, etc. In other cases, the knowledge resource 106 may correspond to a collection of linguistic items that have been manually labeled with intent labels. Still other ways of identifying known intents are possible.

In still other implementations, the computer system 102 can perform its inference without reference to any known intents. That is, in this case, all of the intents in the input data are unknown. Subsection A.4 provides further details regarding this type of implementation of the computer system 102.

Figure 2:
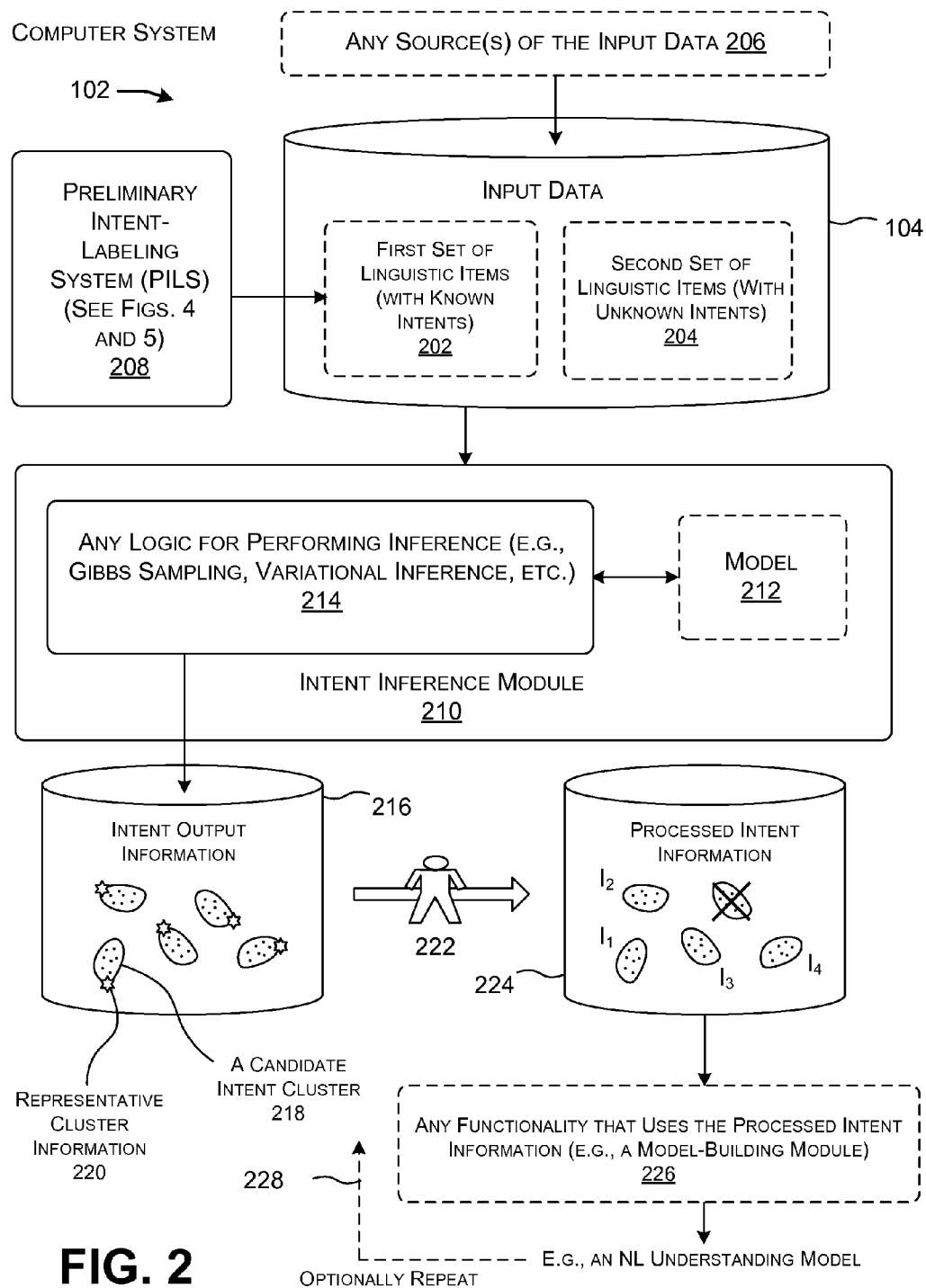
FIG. 2 shows an overview of one manner of implementing the computer system of FIG. 1.

FIG. 2 shows an overview of one manner of implementing the computer system 102 of FIG. 1. The computer system 102 can receive input data from the data store 104. As set forth above, the input data may include the above-described first set 202 of linguistic items having known intent labels associated therewith, and a second set 204 of linguistic items without known intent labels. In another implementation, the input data may omit the first set 202 of linguistic items.

The linguistic items in the data store 104 may originate from any source or combination of sources 206. For example, at least some of the linguistic items may correspond to queries submitted to a search system, such as the Binge search system provided by Microsoft® Corporation of Redmond, Wash. The input data may also describe clicks selections associated with the queries, if available. The computer system 102 may obtain the queries and clicks selections from a click log maintained by the search system. Here, the term "click" is intended to have broad meaning; it refers to any selection made a user that is linked to his or her prior query. For example, a user may make a click selection by clicking on an entry in a list of search results, e.g., using a mouse device, a touch interface selection, and so on. In other cases, a click selection may indicate that a user showed some interest in an item within an interface presentation, such as by hovering over the item using a mouse device or the like. In other cases, a click selection may indicate that a user performed some other follow-up action associated with an item, such as by purchasing the item, filling out a questionnaire, and so on.

More generally, as explained above, a linguistic item and its associated click selection may pertain to any utterance made by a user in any context, coupled with any action made by the user in response to that utterance. For example, in another case, a linguistic item may correspond to an instruction given by a user to a natural language interface. The click selection in this case may correspond to a navigational link selected by the user after making the utterance. In still other cases, some of the linguistic items may lack corresponding click selections. In those cases, the computer system 102 can assign bias-free selection data to the linguistic items based on prior probability information, in place of actual click selection data.

In one implementation, a preliminary intent-labeling system (PILS) 208, to be described below, supplies the known intent labels for the first set 202 of linguistic items. In another implementation, the known intent labels are directly supplied by human annotators, rather than the PILS 208.

An intent inference module 210 associates an intent with each linguistic item in the input data, to provide intent output information. As set forth above, for a particular linguistic item, the intent inference module 210 can either deterministically assign the intent to the item (if a known intent label already exists for this item), or infer the intent for the item (if a known item does not exist) based on click log data. More precisely stated, when inferring an intent for a particular linguistic item, the intent inference module 210 can determine a probabilistic distribution of possible intents for that linguistic item. The intent inference module 210 may then identify the intent class having the highest probability, and assign that intent class to the linguistic item under consideration.

To perform the above-described tasks, the intent inference module 210 may rely on a model 212 that represents the manner in which users are presumed to make intent-based actions when submitting their linguistic items, based on unknown (latent) intent variables. The intent inference module 210 uses any logic 214 for determining values for the unknown intent variables. For example, the logic 214 may use any Markov chain Monte Carlo technique (such as Gibbs sampling), any variational method, any loopy belief propagation method, and so on. A data store 216 may store the intent output information.

In one implementation, the intent inference module 210 groups the intent output information into plural intent clusters, such as representative candidate intent cluster 218. Each intent cluster identifies the linguistic items that are associated with a particular intent. For example, the representative candidate intent cluster 218 may identify all those queries that appear to correspond to requests by users that aim to discover the release dates of movies.

The intent inference module 210 (or a human administrator) may also prepare a digest which summarizes each candidate intent cluster. That digest is referred to herein as representative cluster information. For instance, FIG. 2 uses a star symbol 220 to symbolically represent the representative cluster information associated with candidate intent cluster 218. In one case, the representative cluster information may include the keywords that are most commonly associated with a candidate intent cluster under consideration, and/or a few representative linguistic items selected from the cluster. At this stage, the computer system 102 may assign a placeholder intent label to each candidate cluster in the intent output information, such as a number.

In a next optional stage, a human annotator 222 (or group of annotators) can manually examine the candidate clusters in the intent output information. For example, the human annotator 222 can manually examine the representative cluster information associated with a candidate intent cluster, with or without also examining the full set of linguistic items associated with this cluster. The human annotator 222 can then determine whether the cluster appears to describe a semantically meaningful concept with respect to a particular application or environment under consideration. If so, the human annotator 222 can optionally apply a descriptive label to the cluster, such as "play movie" in one case. The human annotator 222 can also define the action to be invoked for the identified intent, such as a backend instruction to play a movie. On the other hand, if the cluster does not make sense or is not otherwise deemed useful, the human annotator 222 may choose to remove it from the set of candidate intent clusters.

The human annotator 222 produces processed intent information as a result of his or her review effort, which may be stored in a data store 224. For each cluster, the processed intent information may include the label assigned to the cluster by the human annotator 222. Further, the processed intent information may include a subset of the linguistic items in the original cluster which are mostly strongly associated with the intent label. For example, for a "play movie" label, the processed intent information may include a set of n queries that have the highest probability of being associated with this intent.

Functionality 226 can perform any operation on the basis of the processed intent information. For example, the functionality 226 may correspond to a model-building module (not shown) that uses a machine learning technique to generate a language understanding model (such as a spoken language understanding model, or SLU model) based on the processed intent information. Illustrative machine learning techniques that can be used include linear classifiers of any type (such as logistic regression classifiers), boosting algorithm classifiers, neural networks, and so on. For example, a boosting algorithm successively learns a collection of weak learners, and then produces a final model which combines the contributions of the individual weak learners. The boosting algorithm adjusts the weights applied to the training data at each iteration, to thereby place focus on examples that were incorrectly classified in a prior iteration of the algorithm.

In one end use scenario, a human-to-machine interface may use the language understanding model to interpret utterances made by users, and to perform actions associated with those utterances. For example, the human-to-machine interface can detect that a user has made a request to play a movie. In response, the human-to-machine interface may generate a command to a video player application to play the identified movie.

Overall, the natural language understanding model can be produced in an efficient manner due to the above-described automated manner in which the training data, that is used to produce the model, is generated. This is in contrast to traditional techniques which require a user to manually apply a label to each linguistic item in the training set.

In addition, or alternatively, the functionality 226 can update the knowledge resource 106 based on any new intents discovered by the intent inference module 210. In the context of the example of FIG. 1, for example, the functionality 226 can add new links to a knowledge graph to reflect one or more navigational intents, one or more transactional intents, one or more finance-related intents, one or more new informational intents, and so on.

The dashed-line arrow 228 in FIG. 2 indicates that the language understanding model produced by the functionality 226 can be used to assign new labels to the input data in the data store 104, or to some other training data set. This operation yields new input data, including a new (and potentially more robust) version of the first set 202 of linguistic items having known intent labels. The intent inference module 210 can then repeat its operation based on the new input data, to provide new intent output information, which potentially identifies new intents. The functionality 226 can then generate a new language understanding model based on the new intent output information. The computer system 102 can repeat this series of operations for any number of iterations so as to progressively improve the accuracy and expressiveness of the language understanding model.

Figure 3:
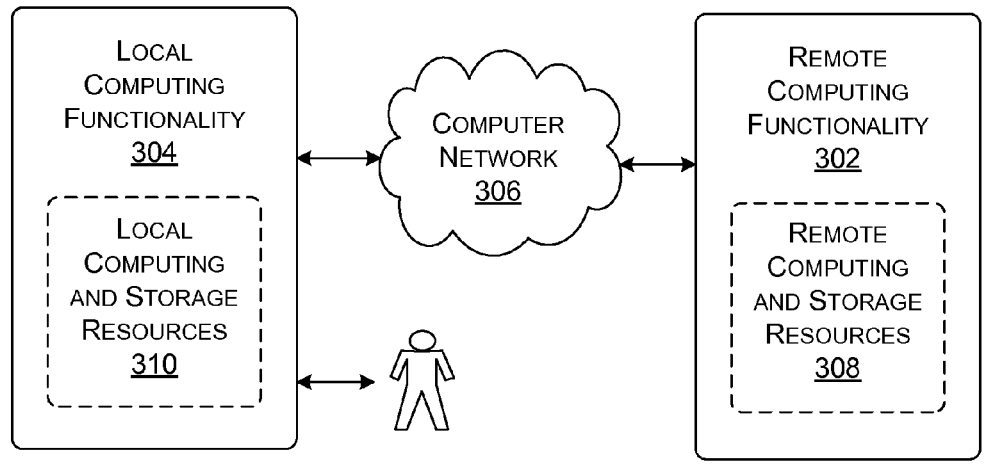
FIG. 3 shows computing equipment that can be used to implement any aspect of the computer system of FIG. 2.

FIG. 3 shows computing equipment that can be used to implement any aspect of the computer system 102 of FIG. 2. The computing equipment may include any combination of remote computing functionality 302 and local computing functionality 304, coupled together via a computer network 306. The remote computing functionality 302 may rely on remote computing and storage resources 308, while the local computing functionality 304 may rely on local computing and storage resource 310.

The remote computing and storage resources 308 may be provided at a single site or distributed among two or more sites. Further, the remote computing and storage resources 308 may be associated with a single controlling entity (e.g., a single company), or may be associated with two or more entities.

More specifically, the remote computing functionality 302 may correspond to one or more server computing devices and associated data stores (e.g., corresponding a cloud computing infrastructure). With respect to a particular user who interacts with the computing equipment, the local computing functionality 304 may correspond to any user computing device, such as a traditional stationary personal computing device, any kind of mobile computing device (e.g., a smartphone, tablet computing device, etc.), a game console device, a set-top box device, and so on. The computer network 306 may correspond to a local area network, a wide area network (e.g., the Internet), one or more point-to-point links, and so on. Section C (below) provides further illustrative details regarding one possible implementation of the computing equipment of FIG. 3.

In one non-limiting allocation of functions, the remote computing functionality 302 may implement all components of the computer system 102 shown in FIG. 2. The local computing functionality 304 may provide a mechanism through which an end user may interact with the computer system 102, e.g., by submitting linguistic items to a human-to-machine interface that has been trained by the computer system 102. In another implementation, the local computing functionality 304 may implement selected parts of the computer system 102, such as the intent inference module 210.

A.2. Functionality for Generating Known Intent Information

Figure 4:
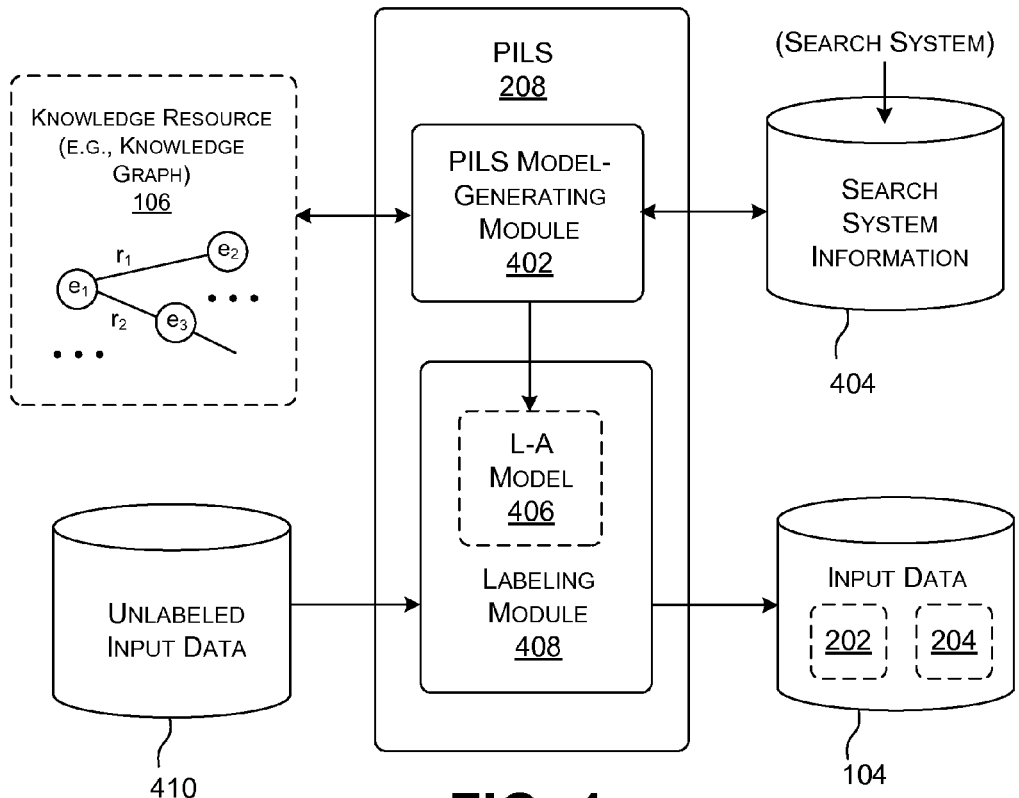
FIG. 4 shows an overview of a preliminary intent-labeling system (PILS), which is a component of the computer system of FIG. 2. The PILS labels some linguistic items in the input data with known intent labels.

FIG. 4 shows an overview of one implementation of the preliminary intent-labeling system (PILS) 208, introduced in the context of FIG. 2. The PILS 208 applies known labels to linguistic items, thereby producing the first set 202 of linguistic items. The details of the PILS 208 set forth herein are presented herein by way of illustration, not limitation. Other implementations of the PILS 208 can use other techniques to generate the first set 202. Further, the computer system 102 can alternatively dispense with the PILS 208 entirely, e.g., by asking an annotator or group of annotators to manually produce the first set 202 of linguistic items. In yet other cases, the computer system 102 can even operate without using the first set 202 of linguistic items.

Figure 5:
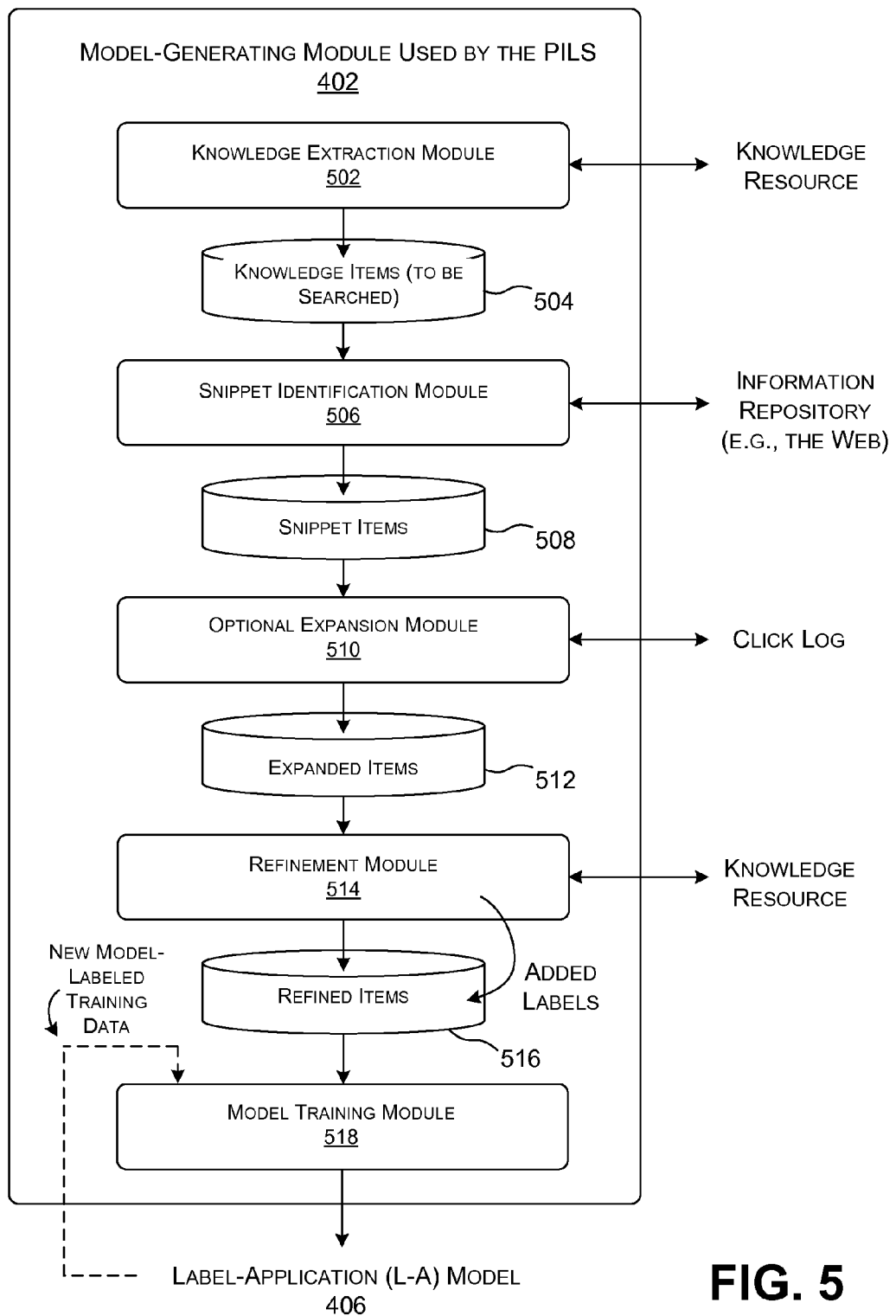
FIG. 5 shows one implementation of a model-generating module, which is a component of the PILS of FIG. 4.

By way of overview, the PILS 208 includes a model-generating module 402 that is configured to extract search system information from a search system (or the like), as guided by knowledge resource information specified in the knowledge resource 106. The search system information may be conceptualized as being maintained in one or more data stores 404, and may encompass information regarding queries submitted by users, search results provided to users in response to the queries, click selections made by users in response to the queries, and so on. Next, the model-generating module 402 formulates training data based on the search system information. Next, the model-generating module 402 uses a machine learning technique to produce a label-application (L-A) model 406 based on the training data. The L-A model 406 is configured to classify the intents of input linguistic items. FIG. 5 and the accompanying description provide additional information regarding one manner of operation of the model-generating module 402.

In a next stage, a labeling module 408 may use the L-A model 406 to assign labels to unlabeled data (provided in a data store 410), to produce the input data (provided in the data store 104). More specifically, the labeling module 408 assigns a label to an input linguistic item if it can determine the intent of the linguistic item with a level of confidence that satisfies an application-specific threshold. If it cannot satisfy that threshold, then the labeling module 408 can decline to assign a label to the linguistic item. Overall, the input data produced by this process includes the above-described two sets of information, the first set 202 of linguistic items with known intents, and the second set 204 of linguistic items without known intents.

FIG. 5 shows one implementation of the model-generating module 402, which generates the L-A model 406. The model-generating module 402 is described below as performing a series of tasks in a particular order. Other implementations can perform these tasks, or subset of these tasks, in an order which differs from the order specified herein.

In a first phase, a knowledge extraction module 502 extracts knowledge items from the knowledge resource 106, and stores the knowledge items in a data store 504. Each knowledge item corresponds to one or more related pieces of information extracted from the knowledge resource 106 (which, again, may correspond to a knowledge graph). For example, assume that the knowledge graph links a plurality of movie titles to the respective actors which appear in those movies. One knowledge item may identify a pairing of a particular movie title with an actor who appears in that movie.

The knowledge extraction module 502 can also store labels associated with the knowledge items. For example, in the above example, the knowledge extraction module 502 can store the relationship of "actor" as a label for the pairing of the particular movie title and actor.

In a next phase, a snippet identification module 506 extracts search snippet items from a search system (or other system) which pertain to the knowledge items, and stores the snippet items in a data store 508. For example, consider the above-described knowledge item that specifies a particular movie title and an actor which appears in that movie. The snippet identification module 506 can submit that knowledge item as a query to the search system. In response, the search system can deliver a search result, formulated as a list of snippet items. Each snippet item pertains to a resource (such as a document stored on the Web) that matches the query, insofar as the resource includes at least one word that matches the specified movie title and at least one word that matches the specified actor. The snippet item itself may correspond to a digest of the resource, such as a short phrase extracted from the resource that contains the specified movie title and the actor.

The snippet identification module 506 can optionally employ a parser to prune each snippet item to remove potentially superfluous content in the snippet item. For example, the parser can identify a smallest grammatical part of a snippet item which contains the matching words of a knowledge item, such as the specified movie title and the actor.

The snippet identification module 506 can also store labels associated with each snippet item. For example, assume that a particular snippet item is associated with a particular knowledge item, which, in turn is associated with a particular label, based on a relationship specified in the knowledge resource 106. The snippet identification module 506 can apply that same label to the snippet item under consideration.

In a next phase, an optional expansion module 510 can expand the snippet items by identifying queries that are related to the snippets. For example, again consider the particular snippet item that contains a specified movie title and an actor. Further assume that the snippet item is associated with a document which is stored at a particular location on the Web, and which has a corresponding resource identifier, such as a Uniform Resource Locator (URL). The expansion module 510 can leverage click log data to identify those queries that: (a) were submitted by users and which resulted in the users subsequently clicking on (or otherwise selecting) the identified document; and (b) which contain at least one of the entities under consideration. For example, the expansion module 510 can identify the n most frequent queries associated with the document under consideration, where each such query includes words that match at least one of the movie title or the actor. The expansion module 510 can store the snippet items together with their associated queries in a data store. Any such item stored in the data store 512 may be regarded as an expanded item, whether it pertains to a snippet item or a query.

Again, the expansion module 510 can also store labels associated with each expanded item. For example, assume that a particular query is associated with a particular snippet item, and that particular snippet item is associated with a particular knowledge item, which, in turn, is associated with a label (such as "actor"). The expansion module 510 can assign the same label to the query under consideration.

In a next phase, a refinement module 514 can improve the quality of the expanded items by assigning additional labels to any expanded item that pertains to two or more intents. For example, assume that an expanded item appears to have words that implicate two or more relations in the knowledge resource 106, such as by discussing both a leading actor in a movie and the release date of a movie. The refinement module 514 can use the knowledge resource 106 to discover the additional relationship(s), and then assign one or more new labels to the expanded item under consideration.

For example, again consider again the case in which a particular expanded item corresponds to a snippet item, and that snippet item specifies a particular movie title and a leading actor. The refinement module 514 examines the knowledge resource 106 to identify additional relations associated with these two entities, as well as additional entities that are connected by these relations. For example, the knowledge resource 106 may indicate that the particular movie is also linked to a particular date via a "release date" relationship. The refinement module 514 can then determine whether any words in the snippet item match the identified list of additional entities, such as the identified release date. If so, the refinement module 514 can apply an additional label to the snippet item which describes the implicated relation, such as by adding a "release date" label to the snippet item under consideration.

A model training module 518 can use any machine learning technique to generate the L-A model 406, using the expanded items as training data. Illustrative machine learning techniques include linear classifiers of any type (such as logistic regression classifiers), boosting algorithm classifiers, neural networks, and so on.

As another refinement operation, the model-generating module 402 can optionally use the L-A model 406 to reclassify the refined items in the data store 516, or some other training set. This yields new labeled input data. The training module 518 can then retrain the L-A model 406 based on the new labeled input data. The training module 518 can repeat this operation one or more additional times. Overall, the training module 518 can potentially improve the accuracy of the L-A model 406 by means of the above-described iterative procedure because the training data that is fed to the training module 518 becomes increasingly more descriptive for each iteration.

Figure 6:
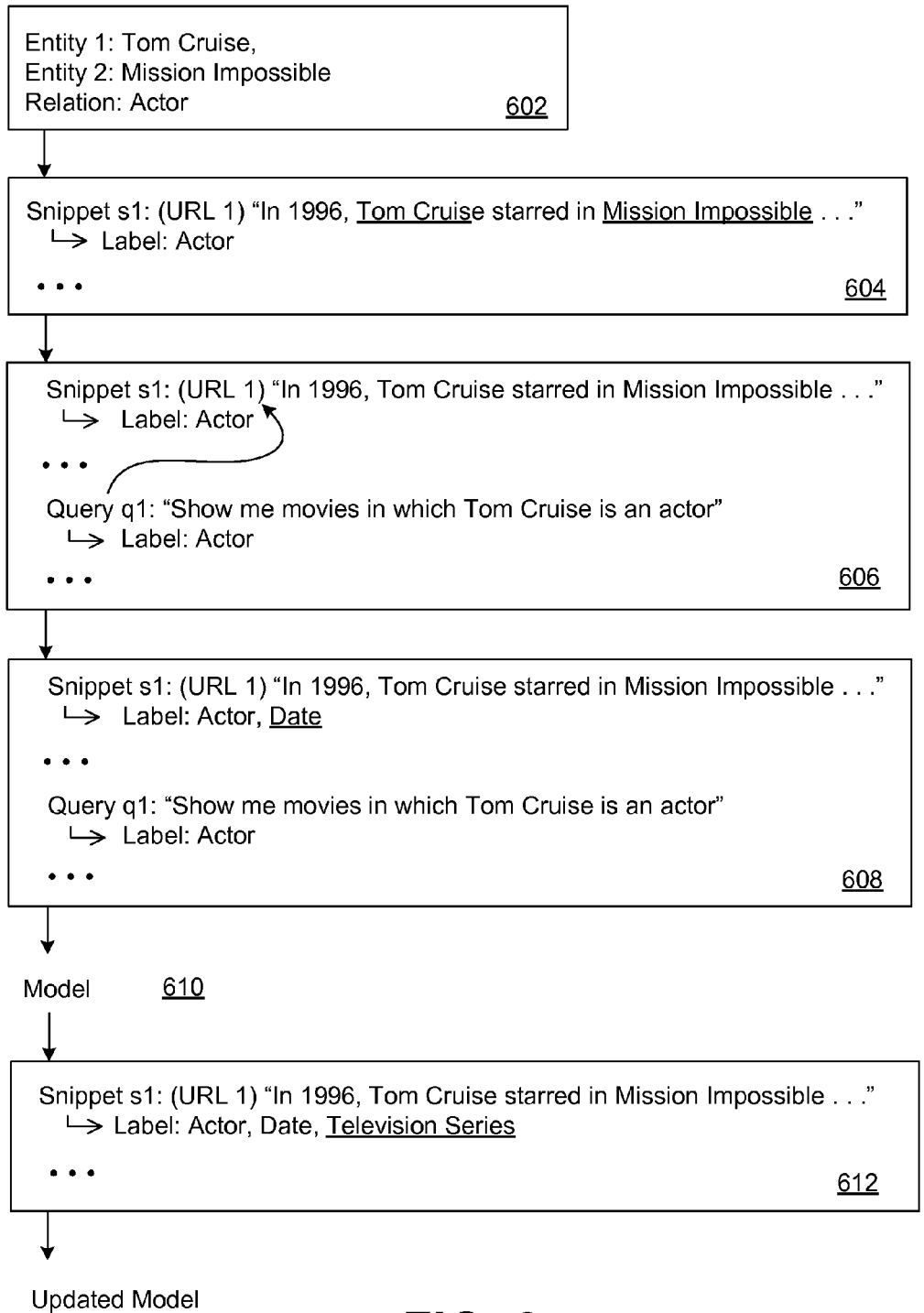
FIG. 6 shows an example of the operation of the PILS of FIG. 4.

FIG. 6 shows an example of the operation of the model-generating module 402 of FIG. 5, which serves to summarize the explanation provided above. In operation 602, the knowledge extraction module 502 identifies one particular knowledge item from the knowledge resource 106, which includes a first entity (the actor name "Tom Cruise"), a second entity (the movie title "Mission Impossible"), and a relation that connects the first entity and the second entity in the knowledge resource (the label "Actor").

In operation 604, the snippet identification module 506 uses the above-described knowledge item as a search query, in response to which it receives a list of snippet items. One such snippet item (s1) contains the text, "In 1996, Tom Cruise starred in Mission Impossible . . . ." Note that the snippet item s1 matches the knowledge item in question because it includes both specified entities, namely Tom Cruise and Mission Impossible. The snippet identification module 506 also associates the label "Actor" with the snippet item; this is because the knowledge item which pertains to this snippet item was given the "Actor" label. Assume that the snippet item s1 corresponds to a particular online resource, such as an online document or website associated with a particular URL or the like.

In operation 606, the expansion module 510 can optionally identify one or more queries that are related to the above-identified snippet item. These queries are related to the snippet item because: (a) users have clicked on the URL associated with the snippet item in direct response to submitting those queries; and (b) each query contains at least the phrase "Tom Cruise" or "Mission Impossible." One such query reads, "Show me movies in which Tom Cruise is an actor." The expansion module 510 may label each such query with the "Actor" label, since each such query ultimately originates from an exploration of the "Actor" relationship. The outcome of operation 606 is a set of expanded items with associated labels.

In operation 608, the refinement module 514 determines whether any words in the expanded items implicate additional intents. For example, the snippet s1 includes a date, "1996." The refinement module 514 can explore all entity names that are linked to "Tom Cruise" and "Mission Impossible" in the knowledge graph, and then determine whether any of these entity names match the term "1996." In the present case, assume that the movie title "Mission Impossible" is linked to the date 1996 via a "release date" link. Based on this discovery, the refinement module 514 can add an additional label to the snippet s1, corresponding to the "release date" relation. Overall, the operation 608 yields a collection of refined items.

In operation 610, the model training module 518 produces the L-A model 406. In operation 612, assume that the model-generating module 402 uses the L-A model 406 that has been learned to reclassify the refined items. Assume that this operation results in adding one more label to the snippet s1, e.g., by adding the label "television series" to indicate that the movie title "Mission Impossible" is also associated with a predecessor television series. Overall, this classification operation yields updated training data. The model training module 518 may then retrain the L-A model 406 based on the updated training data.

A.3. Functionality for Determining Intents Using a Generative Model

Figure 7:
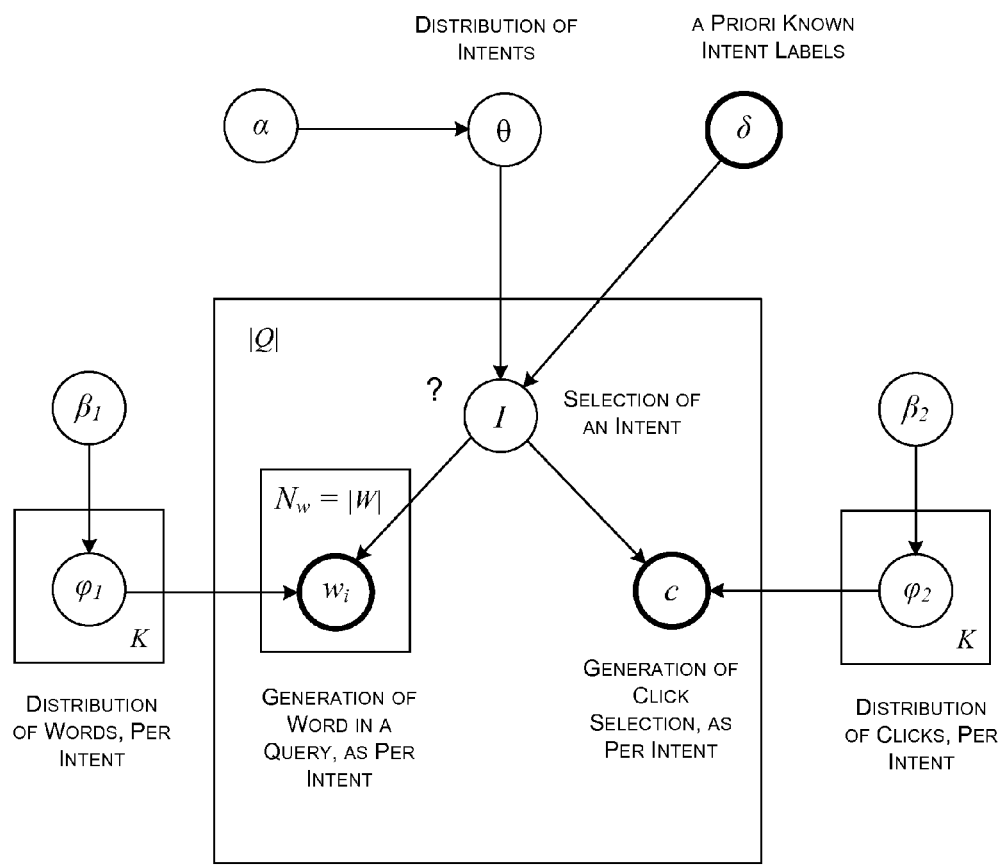
FIG. 7 shows a graphical depiction of one generative model that may be used in the computer system of FIG. 2.

FIG. 7 shows a graphical depiction of one generative model 702, corresponding to a Bayesian hierarchical graphical model. The intent inference module 210 may use the generative model 702 to represent the intent-based actions of users who submit linguistic items, such as queries.

In this non-limiting generative model 702, a user is presumed to submit a query d with a particular intent $I_d$ in mind. The complete set of queries is Q, and the total number of queries is $|Q|$. The intent $I_d$ is expressed as a probabilistic distribution over a set of K possible intent classes, with k corresponding to a particular one of these intent classes. More specifically, a first group of the intents are known a priori, while a second group of the intents are unknown. In FIG. 7, the symbol S represents information regarding the known intents. If the intent is already known, the model 702 specifies that the intent is deterministically assigned to the query based on the known label associated with the query, e.g., as provided by PILS 208. If the intent is not known, the model 702 specifies that the intent is drawn from a multinomial distribution of intents ($\theta$), associated with the hyper-parameter $\alpha$.

The model 702 further assumes that the user takes various actions that are influenced by his or her intent. For example, the user selects each word w of the query d with the intent $I_d$ in mind (based on a bag-of-words assumption), where there are $N_w$, total number of words in the query, and the set of words associated with the query is W. Further, the user makes a click selection c based on the intent $I_d$. Note that the model 702 indicates that the user is assumed to select the words the query in a manner that is independent of the click selection, although other generative models can introduce a dependency between queries and clicks.

The model 702 further indicates that each word w of the query d is generated according to a multinomial distribution $\varphi_1^{I_d}$ (associated with a hyper-parameter $\beta_1$), given the particular intent $I_d$ associated with the query d. These words are selected from a vocabulary V having a total number of words $|V|$. The model 702 further indicates that the click c is generated according to a multinomial distribution $\varphi_2^{I_d}$ (associated with a hyper-parameter $\beta_2$), given the particular intent $I_d$ associated with the query d. The click selections are chosen from a set of possible click selections C, where the total number of click selections is $|C|$.

More generally, FIG. 7 depicts information that is given (i.e., known a priori) with bolded circles, and information that is unknown with non-bolded circles. The logic 214, used by the intent inference module 210, operates to derive values for the intent variables in those cases in which the intent is not established a priori by the PILS 208. More concretely stated, the logic 214 identifies intent labels associated with each linguistic item in the second set 204 of linguistic items. For any individual case, the discovered intent may correspond to a known intent class or an unknown intent class. A known intent class corresponds to one of the intents that appear in the first set 202. Recall that FIG. 1 presented four examples of new intents that are discovered by the computer system 102, such as the new "play movie" intent.

In one technique (among other possible techniques), the logic 214 can use Gibbs sampling to iteratively generate intent values for the linguistic items in the second set 204. In this iterative process, the intent values will converge on a stable approximation of the distribution of true intent values. In one non-limiting case, for a particular iteration, the logic 214 can compute the probability that the user's intent, in submitting a query d, matches an intent class k using the following equation:

$$p(I_d = k \mid c, W, I_{-d}, \alpha, \beta_1, \beta_2) \propto \qquad (1)$$

$$\frac{n_d^k + \alpha}{(|Q| - 1 + K\alpha)} * \frac{n_c^k + \beta_2}{(n_{(.)}^k + |C|\beta_2)} * \prod_{i=1}^{N_w} \frac{n_{w_i}^k + \beta_1}{(n_{(.)}^k + |V|\beta_1)}.$$

In this equation, the notation $I_{-d}$ indicates that the probability is computed for $I_d=k$ by excluding the contribution of query $I_d$. The notation $n_d^k$ refers to the number of queries that are assigned to a semantic class k, excluding the query d. $n_c^k$ is the number of times that the click selection c is assigned to the intent class k. And $n_{w_i}^k$ is the number of times that word $w_i$ is assigned to the class k. In the context of the middle term of the Equation (1), $n_{(.)}^k$ refers to a total number of clicks that have been assigned to intent class k, not just for click c. In the context of the last term of the Equation (1), $n_{(.)}^k$ refers to the total number of times that any word has been assigned to the intent class k, not just word $w_i$.

A.4. Illustrative Variations

The computer system 102 described in the preceding sections can be modified in various ways. This section identifies illustration variations of the computer system 102.

In one variation, the computer system 102 can generate intents without reference to the first set 202 of known intent labels. In a second variation, the computer system 102 can use a different generative model compared to the generative model shown in FIG. 7. For example, different generative models can identify different user actions compared to the generative model 702 of FIG. 7. Alternatively, or in addition, different generative models can describe user actions with a different granularity compared to the generative model 702 of FIG. 7. Alternatively, or in addition, different generative models can identify different dependencies among user actions compared to the generative model 702 of FIG. 7. In a third variation, the computer system 102 can use different logic to infer unknown intents, compared to the Gibbs sampling technique described above in Subsection A.3.

Figure 8:
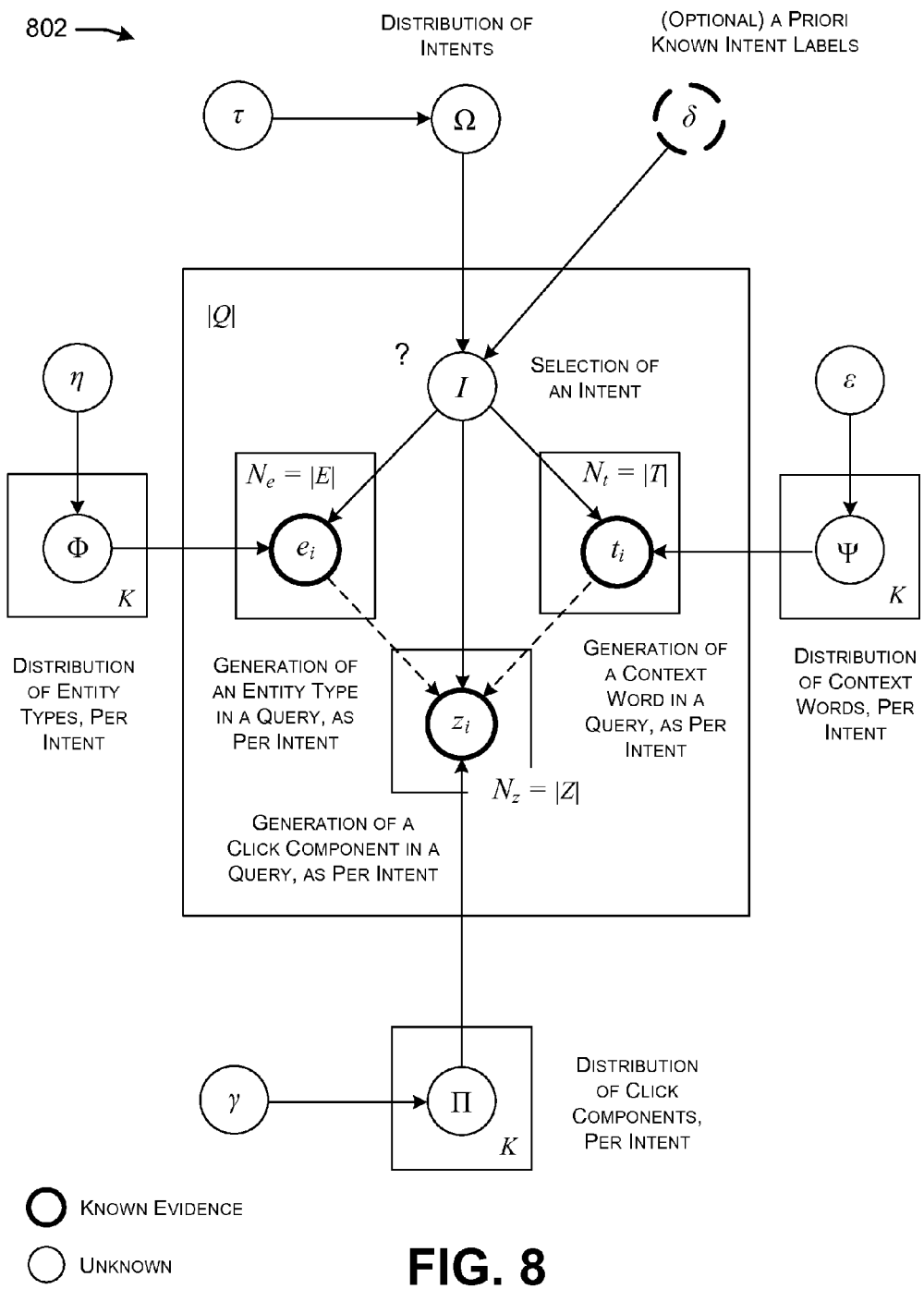
FIG. 8 shows a graphical depiction of another generative model that may be used in the computer system of FIG. 2.

Advancing to FIG. 8, this figure graphically depicts a graphical model 802 which adopts some of the modifications summarized above. For example, in this model, a user is again presumed to input a query d with a particular intent $I_d$ in mind But here, the model 802 indicates that the known intent information (associated with the symbol $\delta$) may optionally be omitted. If that is the case, the model 802 indicates that the intent $I_d$ of the query d is inferred based on click log data. More specifically, the intent $I_d$ is drawn from a multinomial distribution $\Omega$ (associated with hyper-parameter $\tau$).

Further, the model 802 again assumes that the user formulates the words of the query d on the basis of his or her intent $I_d$. But here the model 802 represents the words in the query in a more finely granulated manner compared to the model 702 of FIG. 7. More specifically, in the model 802 of FIG. 8, a query is assumed to have $N_e$ entity type items (including zero, one, or more such items), which are chosen based on a bag-of-words assumption. An entity type item e describes a type of entity that is specified in the query, while an entity collection E corresponds to the set of all entity type items in the query. For example, assume that the query contains the entity name "Brad Pitt." The entity type for that entity name may correspond to "actor."

The query d is also assumed to have $N_t$ context words (including zero, one, or more such words), which are chosen based on a bag-of-words assumption. A context word t corresponds to any word in the query other than an entity name, which specifies the context in which the user is making reference to the entity name(s). A context word collection T corresponds to all of the context words in a query. For example, in a query that reads, "latest movie starring Brad Pitt," each of the words in the phrase "latest movie starring" may correspond to a context word.

Further, the model 802 again assumes that the user makes a click selection Z based on his her intent $I_d$, but the model 802 now models each individual component z of a click selection Z, there being $N_z$ click components in a click selection. For example, assume that the user clicks on a URL having the following form: http://movie-info/brad-pitt/movies. The individual components in the query include "movie-info," "brad-pitt," and "movies."

Completing the description of the generative model of FIG. 8, the model 802 assumes that the user selects each entity type item e according to a distribution $\Phi^{I_d}$ of entity types, associated with a particular query intent $I_d$. The model 802 further assumes that the user selects each context word t according to a distribution $\Psi^{I_d}$ associated with a particular query intent $I_d$. And the model 802 assumes that the user selects each click component z according to a distribution $\Pi^{I_d}$ associated with the particular query intent $I_d$. The distributions $\Phi^{I_d}$, $\Psi^{I_d}$, and $\Pi^{I_d}$ are associated with the hyper-parameters η, ε, and γ, respectively.

In FIG. 8, the model 802 assumes that there is no dependency between the entity types E and the click selection Z, and that there is no dependency between the context words T and the click selection Z. However, another model can add these dependencies, as reflected by the dashed-line arrows in FIG. 8. Doing so, however, will add to the complexity of the model 802, e.g., by increasing the number of parameters to be estimated, as well as the number of examples needed; this increased complexity, in turn, may result in an increase in the amount of processing resources that are required to solve for the unknown variables in the model 802.

Figure 9:
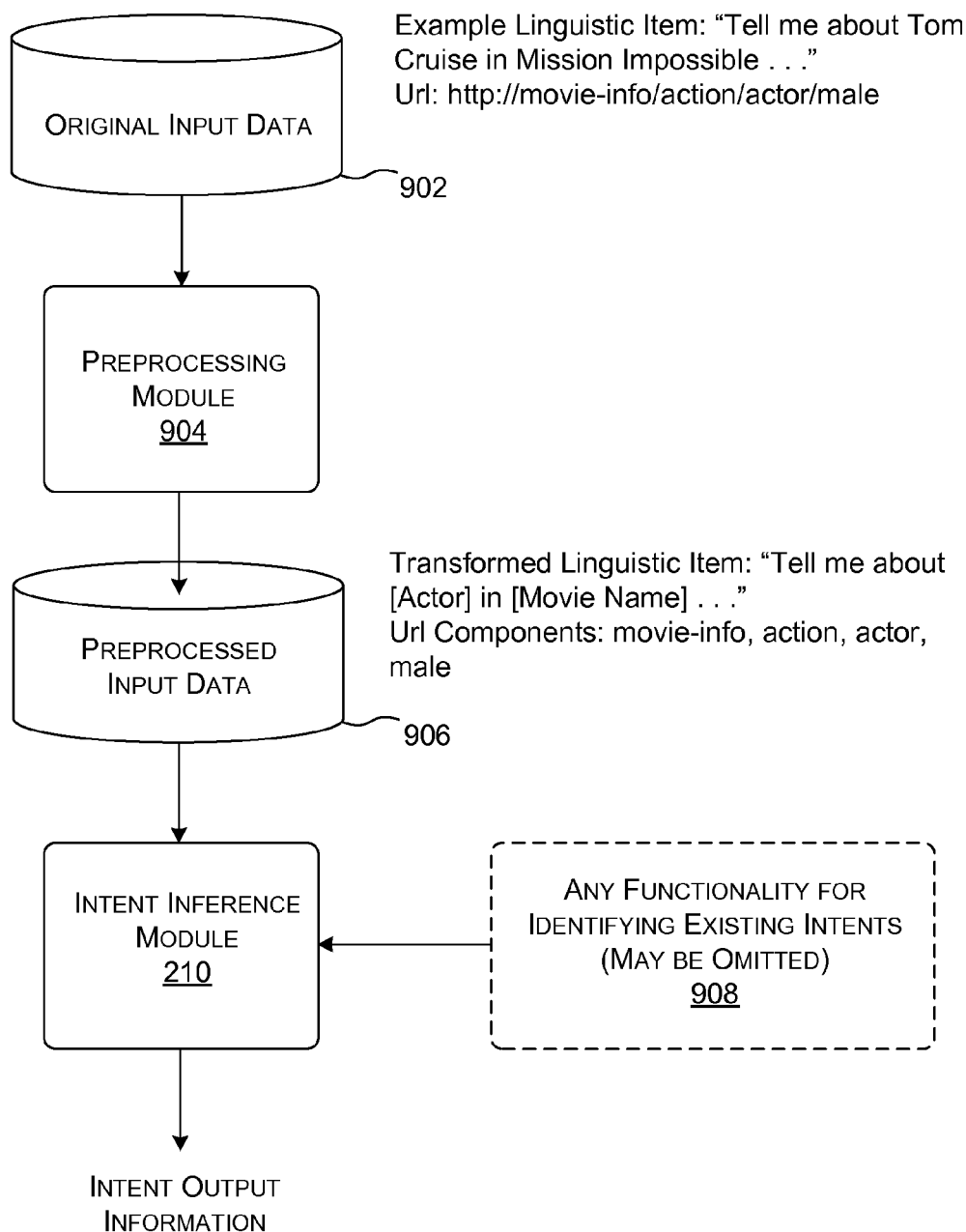
FIG. 9 shows a manner in which a preprocessing module may be integrated into the computer system of FIG. 2, to accommodate the use of the generative model of FIG. 8.

FIG. 9 shows one manner in which the computer system 102 of FIG. 2 can be adapted to accommodate the generative model 802 described above. In this case, a data store 902 provides original input data, corresponding to a set of entirely unlabeled linguistic items, or a first set 202 of linguistic items with known intent labels and a second set 204 of linguistic items without known intent labels.

A preprocessing module 904 performs preprocessing operations on the linguistic items in the original data set. For example, the preprocessing module 904 can use any entity extraction method to identify the presence of an entity name in an input linguistic item. The preprocessing module 904 can then replace the entity name with the entity type associated with the name. For example, the preprocessing module 904 can perform this task by consulting any type of knowledge resource (such as a dictionary) to identify a list of possible entity names that may appear in a linguistic item, together with the entity types associated with those entity names. By virtue of this operation, the computer system 102 can represent a linguistic item in a more economical manner, e.g., with a reduced vocabulary. Further, the entity types may be more relevant to the training of the model 802 compared to the original entity names. As another preprocessing operation, the preprocessing module 904 can decompose each click selection in the input data to identify its individual click components, e.g., by parsing a click selection based on the presence of "/" characters in the string. As a result of its operation, the preprocessing module 904 yields preprocessed input data, which it may store in a data store 906. The preprocessing module 904 may also identify the context words in the input linguistic item, if any.

Consider one instance of the transformation produced by the preprocessing module, illustrated in FIG. 9. An original query in the original input data contains the phrase, "Tell me about Tom Cruise in Mission Impossible." The preprocessing module 904 can replace entity names with entity types in this query, to produce "Tell me about [Actor] in [Movie Name]." Further note that the original click selection reads, http://movie-info/action/actor/male. The preprocessing module 904 can identify the click components as "movie-info," "action," "actor," and "male."

The intent inference module 210 operates based on the preprocessed input data, not the original input data. In one case, the intent inference module 210 can rely on known intent labels produced by functionality 908. In another case, the intent inference module 210 can perform its operation without reference to known intent labels.

The logic 214 can use any inference technique to determine the unknown (latent) intent variables specified by the model 802. One such technique is Gibbs sampling, described above in Subsection A.3. Another technique is a variational Bayesian method, described below.

The variational technique operates by generating a fully factored variational distribution q(I, Φ, Ψ, Π), which is an approximation of the posterior distribution p(I, Φ, Ψ, Π|E, T, Z; η, ε, γ, τ). More specifically, the variation distribution may be expressed as:

$$q(I, \Phi, \Psi, \Pi) = \prod_{d=1}^{Q} q(I_d; \lambda_d) \prod_{k=1}^{K} q(\Phi_k; \mu_k) \prod_{k=1}^{K} q(\Psi_k; \nu_k) \prod_{k=1}^{K} q(\Pi_k; \rho_k). \quad (2)$$

In this expression, $q(I_d; \lambda_d)$ is a multinomial distribution Multi(1, $\lambda_d$). Further, $q(\Phi_k; \mu_k)$, $q(\Psi_k; \nu_k)$, and $q(\Pi_k; \rho_k)$ are each Dirichlet distributions. $\{\lambda_d\}$, $\{\mu_k\}$, $\{\nu_k\}$, and $\{\rho_k\}$ are variational parameters.

At each iteration, the logic 214 determines the divergence between the posterior distribution p and the variational distribution q, e.g., using Kullback-Leibler (KL) divergence or the like. The logic 214 then adjusts the variational parameters based on the divergence. The logic 214 repeats this process until the divergence measure reaches a prescribed convergence target.

More specifically, the logic 214 can compute the parameter $\lambda_{dk}$ for all queries d and all intent classes k, using the following equation:

$$\lambda_{dk} \propto \exp\left\{\sum_{i} e_{di}(\psi(\mu_{ki}) - \psi(\mu_{k0})) + \right. \quad (3)$$

$$\sum_r t_{dr}(\psi(v_{kr}) - \psi(v_{k0})) + \sum_j z_{dj}(\psi(\rho_{kj}) - \psi(\rho_{k0})) + \log \tau_k \Bigg\}.$$

In this Equation, $\psi(.)$ represents the digamma function (and also the logarithmic derivative of the gamma function). Further, $\mu_{k0} = \Sigma_i \mu_{ki}$, $v_{k0} = \Sigma_r v_{kr}$, and $\rho_{k0} = \Sigma_j \rho_{kj}$.

The probability of the i-th entity type (e) in the intent k can be computed using the following equation, for all k's:

$$\mu_{ki} = \eta_i + \sum_{d=1}^{Q} e_{di} \lambda_{dk}. \qquad (4)$$

The probability the r-th context word in intent k can be computed using the following equation, for all k's:

$$v_{kr} = \varepsilon_r + \sum_{d=1}^{Q} t_{dr} \lambda_{dk}. \qquad (5)$$

And the probability of the j-th click component z in intent k can be computed using the following equation, for all k's:

$$\rho_{kj} = \gamma_j + \sum_{d=1}^{Q} z_{dj} \lambda_{dk}. \qquad (6)$$

B. Illustrative Processes

Figure 10:
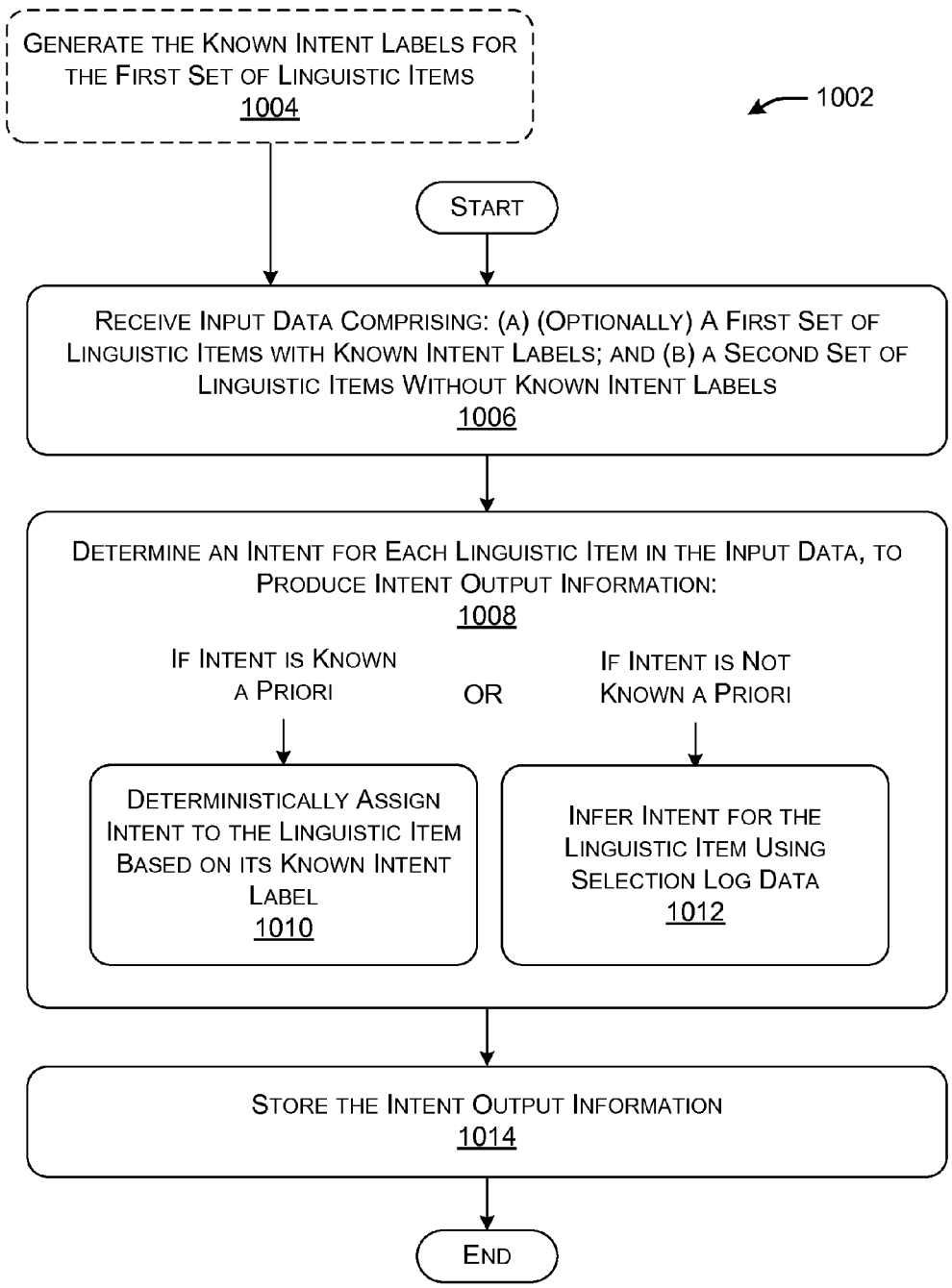
FIG. 10 is a procedure which describes one manner of generating intent output information, using the computer system of FIG. 2.
Figure 11:
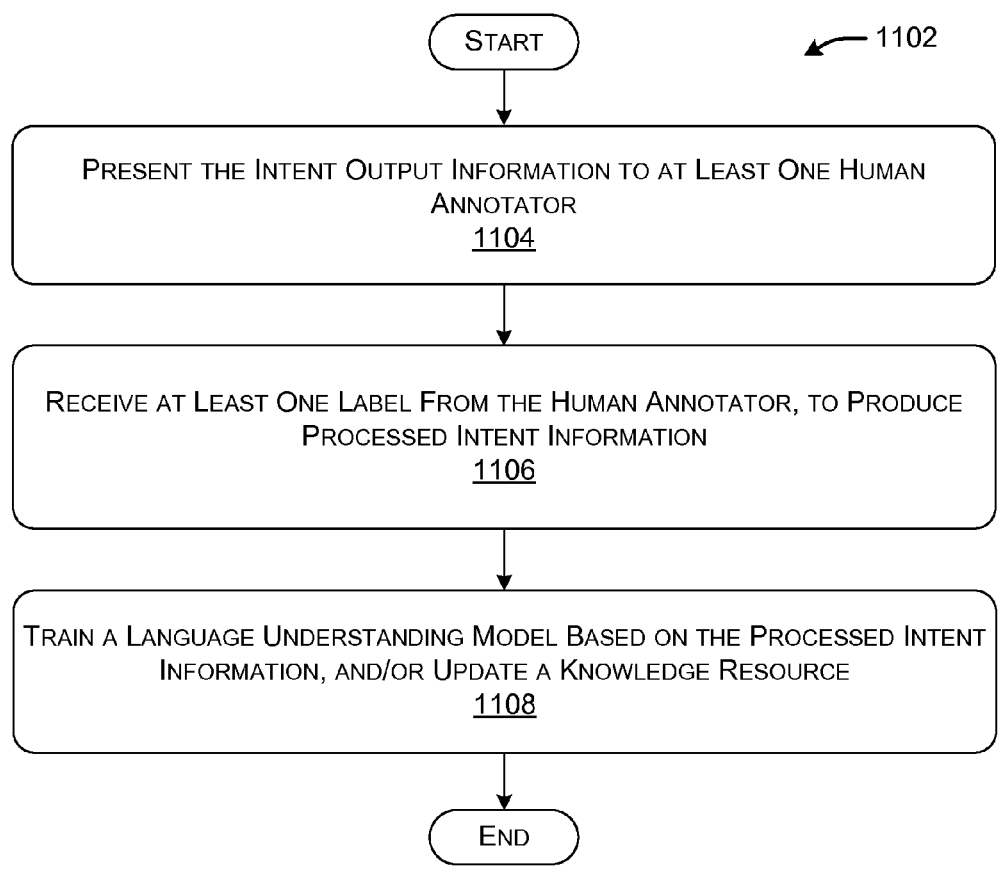
FIG. 11 is a procedure which describes one manner of applying the intent output information produced by the procedure of FIG. 10.

FIGS. 10 and 11 show procedures that explains one manner of operation of the computer system 102 of Section A. Since the principles underlying the operation of the computer system 102 have already been described in Section A, certain operations will be addressed in summary fashion in this section.

To begin with, FIG. 10 shows a procedure 1002 which describes one manner of generating intent output information, using the computer system 102 of FIG. 1. In preliminary block 1004, the PILS 208 (or any other functionality or a human annotator) may optionally assign known intent labels to a first set 202 of linguistic items. In block 1006, the computer system 102 receives input data that comprises the first set 202 of linguistic items with known intent labels and a second set 204 of linguistic items without known intent labels. In an alternative case, the input data may omit the first data set 202.

In block 1008, the computer system 102 computes an intent for each linguistic item in the input data using a model, such as a generative model of any type described in Section A. The intent is selected from a set of K possible intent classes, including a first group of known intents and a second group of unknown intents. More specifically, if the intent of the linguistic item is already known, then, in block 1010, the computer system 102 can deterministically assign the intent for this linguistic item to match its known intent label. But if the intent of the linguistic item is not known, then, in block 1012, the computer system 102 can infer the intent using the model. In block 1014, the computer system 102 can store the intent output information, which reflects the labeled linguistic items produced in block 1008.

FIG. 11 is a procedure 1102 which describes one manner of applying the intent output information produced by the procedure of FIG. 10. In block 1104, the computer system 102 can optionally present the intent output information to at least one human annotator 222. The intent output information may include representative cluster information as described in Section A, such as representative words selected from the candidate intent clusters. In block 1106, the computer system 102 can receive at least one manually-supplied intent label from the annotator 222, to yield processed intent information. More specifically, the processed intent information may comprise representative queries selected from the meaningful intent clusters, together with whatever labels are applied by the annotator 222 to the clusters. In block 1108, a model-building module can optionally train a language understanding model based on the processed intent information provided in block 1106. Alternatively, or in addition, the computer system 102 can update a knowledge resource based on the processed intent information.

C. Representative Computing Functionality

FIG. 12 shows computing functionality 1202 that can be used to implement any aspect of the computer system 102 of FIG. 1. For instance, the type of computing functionality 1202 shown in FIG. 12 can be used to implement any aspect of the remote computing functionality 302 and/or the local computing functionality 304 of FIG. 3. In all cases, the computing functionality 1202 represents one or more physical and tangible processing mechanisms.

The computing functionality 1202 can include one or more processing devices 1204, such as one or more central processing units (CPUs), and/or one or more graphical processing units (GPUs), and so on.

The computing functionality 1202 can also include any storage resources 1206 for storing any kind of information, such as code, settings, data, etc. Without limitation, for instance, the storage resources 1206 may include any of: RAM of any type(s), ROM of any type(s), flash devices, hard disks, optical disks, and so on. More generally, any storage resource can use any technology for storing information. Further, any storage resource may provide volatile or non-volatile retention of information. Further, any storage resource may represent a fixed or removal component of the computing functionality 1202. The computing functionality 1202 may perform any of the functions described above when the processing devices 1204 carry out instructions stored in any storage resource or combination of storage resources.

As to terminology, any of the storage resources 1206, or any combination of the storage resources 1206, may be regarded as a computer readable medium. In many cases, a computer readable medium represents some form of physical and tangible entity. The term computer readable medium also encompasses propagated signals, e.g., transmitted or received via physical conduit and/or air or other wireless medium, etc. However, the specific terms "computer readable storage medium" and "computer readable medium device" expressly exclude propagated signals per se, while including all other forms of computer readable media.

The computing functionality 1202 also includes one or more drive mechanisms 1208 for interacting with any storage resource, such as a hard disk drive mechanism, an optical disk drive mechanism, and so on.

The computing functionality 1202 also includes an input/output module 1210 for receiving various inputs (via input devices 1212), and for providing various outputs (via output devices 1214). Illustrative types of input devices include a key input mechanism, a mouse device input mechanism, a touch interface input mechanism, a voice recognition input mechanism, etc. One particular output mechanism may include a presentation device 1216 and an associated graphical user interface (GUI) 1218. The computing functionality 1202 can also include one or more network interfaces 1220 for exchanging data with other devices via a computer network 1222. One or more communication buses 1224 communicatively couple the above-described components together.

The computer network 1222 can be implemented in any manner, e.g., by a local area network, a wide area network (e.g., the Internet), point-to-point connections, etc., or any combination thereof. The computer network 1222 can include any combination of hardwired links, wireless links, routers, gateway functionality, name servers, etc., governed by any protocol or combination of protocols.

Alternatively, or in addition, any of the functions described in the preceding sections can be performed, at least in part, by one or more hardware logic components. For example, without limitation, the computing functionality 1202 can be implemented using one or more of: Field-programmable Gate Arrays (FPGAs); Application-specific Integrated Circuits (ASICs); Application-specific Standard Products (ASSPs); System-on-a-chip systems (SOCs); Complex Programmable Logic Devices (CPLDs), etc.

In closing, the functionality described above can employ various mechanisms to ensure the privacy of user data maintained by the functionality (if any), in accordance with user expectations and applicable laws of relevant jurisdictions. For example, the functionality can allow a user to expressly opt in to (and then expressly opt out of) the provisions of the functionality. The functionality can also provide suitable security mechanisms to ensure the privacy of the user data (such as data-sanitizing mechanisms, encryption mechanisms, password-protection mechanisms, etc.).

Further, the description may have described various concepts in the context of illustrative challenges or problems. This manner of explanation does not constitute a representation that others have appreciated and/or articulated the challenges or problems in the manner specified herein. Further, the claimed subject matter is not limited to implementations that solve any or all of the noted challenges/problems.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method implemented by one or more computing devices, the method comprising:
   receiving input data, the input data comprising linguistic items including:
      a first set of linguistic items with known intent labels, the known intent labels representing known relations between entities provided by a knowledge resource; and
      a second set of linguistic items without known intent labels provided by the knowledge resource;
   determining intents for the linguistic items in the input data to produce intent output information, the determining comprising:
      when a respective linguistic item corresponds to a member of the first set, deterministically assigning a respective known intent to the respective linguistic item based at least on a respective known intent label associated with the respective linguistic item; and
      when the respective linguistic item corresponds to a member of the second set, inferring the intent associated with the respective linguistic item based at least on selection log data; and
   storing the intent output information in a data store,
   the determining including discovering a new intent for an individual linguistic item of the second set that identifies an individual entity represented in the knowledge resource, the new intent identifying a new relation for the individual entity that is not included in the known relations provided by the knowledge resource,
   the selection log data reflecting actions of users associated with using various linguistic items with the known intents and with the new intent.

2. The method of claim 1, wherein the linguistic items in the input data correspond to respective queries submitted to a search system, and the selection log data is made up of click selections made by users in response to submitting the queries.

3. The method of claim 1, wherein the individual entity is a person.

4. The method of claim 3, wherein the knowledge resource is a knowledge graph.

5. The method of claim 1, wherein the known intent labels correspond to informational relations between entities specified in the knowledge resource.

6. The method of claim 1, wherein the new intent discovered for the individual linguistic item corresponds to a navigational intent in which a request is made to navigate in a particular manner with respect to the individual entity identified by the individual linguistic item.

7. The method of claim 1, wherein the new intent discovered for the individual linguistic item corresponds to a transactional intent in which a request is made to perform some action on the individual entity identified by the individual linguistic item.

8. The method of claim 1, further comprising, prior to performing said determining, identifying, for at least some of the linguistic items in the input data, entity types associated with entities specified in the input data.

9. The method of claim 1, further comprising, prior to performing said determining, identifying, for at least some of the linguistic items in the input data, components of click selections specified in the input data.

10. The method of claim 1, wherein said inferring uses a Bayesian hierarchical graphical model, and wherein the model represents user actions based on a process which involves:
    drawing an intent based on a distribution of intents, to provide a specified intent;
    generating a linguistic item having one or more words, each word being drawn according to a distribution of words associated with the specified intent; and
    generating a click selection according to a distribution of click selections associated with the specified intent.

11. The method of claim 1, wherein said inferring uses a Bayesian hierarchical graphical model, and where the model represents user actions based on a process which involves:
    drawing an intent based on a distribution of intents, to provide a specified intent;

generating one or more entity types, each entity type being drawn according to a distribution of entity types associated with the specified intent;

generating one or more context words, each context word being drawn according to a distribution of context words associated with the specified intent; and generating one or more click components, each click component being drawn according to a distribution of click components associated with the specified intent.

12. The method of claim 1, wherein said inferring employs a Markov chain Monte Carlo technique to produce the intent output information.

13. The method of claim 1, wherein said inferring employs a variational technique to produce the intent output information.

14. The method of claim 1, further comprising training a language understanding model based at least on the intent output information.

15. A computer system comprising:
a processing device; and
a computer readable storage medium storing computer readable instructions which, when executed by the processing device, cause the processing device to:
receive input data, the input data comprising a plurality of linguistic items, individual linguistic items corresponding to one or more words submitted by a user and being associated with a click selection made by the user in response to submitting the one or more words; and
use a generative model to determine intents for at least some of the linguistic items in the input data, the intents including at least one previously-known intent and at least one new intent discovered by the generative model,
the generative model representing user actions based on a process which involves drawing a specified intent for a specified linguistic item based at least on a distribution of intents, the distribution representing probabilities associated with the at least one previously-known intent and the at least one new intent discovered by the generative model.

16. The computer system of claim 15,
wherein the input data includes a first set of linguistic items with known intent labels, and a second set of linguistic items without known intent labels, and
wherein the computer readable instructions, when executed by the processing device, cause the processing device to determine the intents by:
when a respective linguistic item corresponds to a member of the first set, deterministically assigning an intent to the respective linguistic item based at least on a respective known intent label associated with the respective linguistic item; and
when the respective linguistic item corresponds to a member of the second set, inferring the intent associated with the respective linguistic item using the generative model in conjunction with click selection data.

17. The computer system of claim 15, wherein the computer readable instructions, when executed by the processing device, cause the processing device to:
generate the specified linguistic item having one or more words, each word being drawn according to a distribution of words associated with the specified intent; and
generate a click selection according to a distribution of click selections associated with the specified intent.

18. The computer system of claim 15, wherein the computer readable instructions, when executed by the processing device, cause the processing device to:
generate one or more entity types, each entity type being drawn according to a distribution of entity types associated with the specified intent;
generate one or more context words, each context word being drawn according to a distribution of context words associated with the specified intent; and
generate one or more click components, each click component being drawn according to a distribution of click components associated with the specified intent.

19. A computer system comprising:
a processing device; and
a computer readable storage medium storing computer readable instructions which, when executed by the processing device, cause the processing device to:
receive input data, the input data comprising a first set of linguistic items with known intent labels representing known intents and a second set of linguistic items without known intent labels, the known intent labels being obtained or derived from a knowledge resource that represents the known intents as known relations between entities;
determine intents for respective linguistic items in the input data to produce intent output information, the intents being determined based at least on the known intent labels and selection log data, the selection loci data reflecting selections made by users in response to submitting linguistic items with the known intents and with new intents that are not represented by the knowledge resource, the new intents representing new relations between individual entities that are not provided by the known relations of the knowledge resource;
store the intent output information in a data store, the intent output information including at least one of the new intents that is discovered using the selection log data; and
produce a language understanding model based at least on the intent output information.

20. The computer system of claim 19, wherein the computer readable instructions, when executed by the processing device, cause the processing device to:
produce the language understanding model based at least on the intent output information in combination with labels added by at least one human annotator.

* * * * *